United States Patent
Lim et al.

(10) Patent No.: US 12,457,003 B2
(45) Date of Patent: Oct. 28, 2025

(54) METHOD FOR APPLYING MSD AND APPARATUS THEREOF

(71) Applicant: LG ELECTRONICS INC., Seoul (KR)

(72) Inventors: Suhwan Lim, Seoul (KR); Yoonoh Yang, Seoul (KR); Sangwook Lee, Seoul (KR); Jinyup Hwang, Seoul (KR); Jongkeun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 470 days.

(21) Appl. No.: 17/917,507

(22) PCT Filed: Apr. 8, 2021

(86) PCT No.: PCT/KR2021/004429
§ 371 (c)(1),
(2) Date: Oct. 6, 2022

(87) PCT Pub. No.: WO2021/206475
PCT Pub. Date: Oct. 14, 2021

(65) Prior Publication Data
US 2023/0155625 A1    May 18, 2023

(30) Foreign Application Priority Data
Apr. 9, 2020    (KR) .................. 10-2020-0043356

(51) Int. Cl.
*H04B 1/525*    (2015.01)
*H04W 72/0453*    (2023.01)

(52) U.S. Cl.
CPC .................. *H04B 1/525* (2013.01)

(58) Field of Classification Search
CPC .......... H04B 1/005; H04B 1/50; H04B 1/525; H04W 72/04; H04W 72/0453;
(Continued)

(56) References Cited

U.S. PATENT DOCUMENTS 10,560,139 B2    2/2020 Brunel et al.
10,980,074 B2*   4/2021 Tsai .................. H04W 76/15
(Continued)

OTHER PUBLICATIONS

3rd Generation Partnership Project, Technical Specification Group Radio Access Network, NR, User Equipment (UE) radio transmission and reception, Part 3, Range 1 and Range 2 Interworking Operation With Other Radios (Release 15), 3GPP TS 38.101-3 V15.6.0, Jul. 4, 2019, p. 1-172, Section 7.3B.2.3.5; and tables 7.3B.2.3.5.1-1, 7.3B.2.3.5.2-1.

*Primary Examiner* — Quochien B Vuong
(74) *Attorney, Agent, or Firm* — BRYAN CAVE LEIGHTON PAISSNER LLP

(57) ABSTRACT

A disclosure of this specification provides a device configured to operate in a wireless system, the device comprising: a transceiver configured with an Evolved Universal Terrestrial Radio Access (E-UTRA)-New Radio (NR) Dual Connectivity (EN-DC), wherein the EN-DC is configured to use three bands, a processor operably connectable to the transceiver, wherein the processer is configured to: control the transceiver to receive a downlink signal, control the transceiver to transmit an uplink signal via at least two bands among the three bands, wherein a value of Maximum Sensitivity Degradation (MSD) is applied to a reference sensitivity for receiving the downlink signal

15 Claims, 31 Drawing Sheets

(58) Field of Classification Search
CPC ..... H04W 76/10; H04W 76/15; H04W 76/16; Y02D 30/00; Y02D 30/70
See application file for complete search history.

(56) References Cited

U.S. PATENT DOCUMENTS

| | | |
|---|---|---|
| 11,375,442 B2 * | 6/2022 | Jung .................... H04W 48/18 |
| 11,758,602 B2 * | 9/2023 | Subramanian ........ H04W 76/16 370/329 |
| 2017/0054535 A1 | 2/2017 | Lim et al. |
| 2018/0091186 A1 | 3/2018 | Lim et al. |
| 2019/0230663 A1 | 7/2019 | Lim |

* cited by examiner

METHOD FOR APPLYING MSD AND APPARATUS THEREOF

CROSS-REFERENCE TO RELATED APPLICATIONS

This application is the National Stage filing under 35 U.S.C. 371 of International Application No. PCT/KR2021/004429, filed on Apr. 8, 2021, which claims the benefit of Korean Application No. 10-2020-0043356, filed on Apr. 9, 2020, the contents of which are all hereby incorporated by reference herein in their entirety.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible. A mobile device should be configured to satisfy a reference sensitivity power level (REFSENS) which is the minimum average power for each antenna port of the mobile device when receiving the downlink signal.

When a harmonics component and/or an intermodulation distortion (IMD) component occurs, there is a possibility that the REFSENS for the downlink signal may not be satisfied due to the uplink signal transmitted by the mobile device.

When a harmonics component and/or an intermodulation distortion (IMD) component occurs, there is a possibility that the REFSENS for the downlink signal may not be satisfied due to the uplink signal transmitted by the mobile device.

SUMMARY

Accordingly, a disclosure of the specification has been made in an effort to solve the aforementioned problem.

In accordance with an embodiment of the present disclosure, a disclosure of this specification provides a device configured to operate in a wireless system, the device comprising: a transceiver configured with an Evolved Universal Terrestrial Radio Access (E-UTRA)—New Radio (NR) Dual Connectivity (EN-DC), wherein the EN-DC is configured to use three bands, a processor operably connectable to the transceiver, wherein the processer is configured to: control the transceiver to receive a downlink signal, control the transceiver to transmit an uplink signal via at least two bands among the three bands, wherein a value of Maximum Sensitivity Degradation (MSD) is applied to a reference sensitivity for receiving the downlink signal, wherein the value of the MSD is pre-configured for a first combination of bands 7, n8 and n40, a second combination of band 8, n28 and n77, a third combination of bands 3, n28 and n77, a fourth combination of bands 3, n75 and n78, a fifth combination of bands 2, n38 and n78, a sixth combination of bands 66, n38 and n78, a seventh combination of bands 28, n3 and n77, an eighth combination of bands 41, n3 and n77, a ninth combination of bands 41, n3 and n78, a tenth combination of bands 41, n28 and n77, an eleventh combination of bands 41, n28 and n78, a twelfth combination of bands 18, 41 and n3, a thirteenth combination of bands 18, 41 and n77 or a fourteenth combination of bands 18, 41 and n78.

The present disclosure can have various advantageous effects.

For example, by performing disclosure of this specification, UE can transmit signal with dual uplink by applying MSD value.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
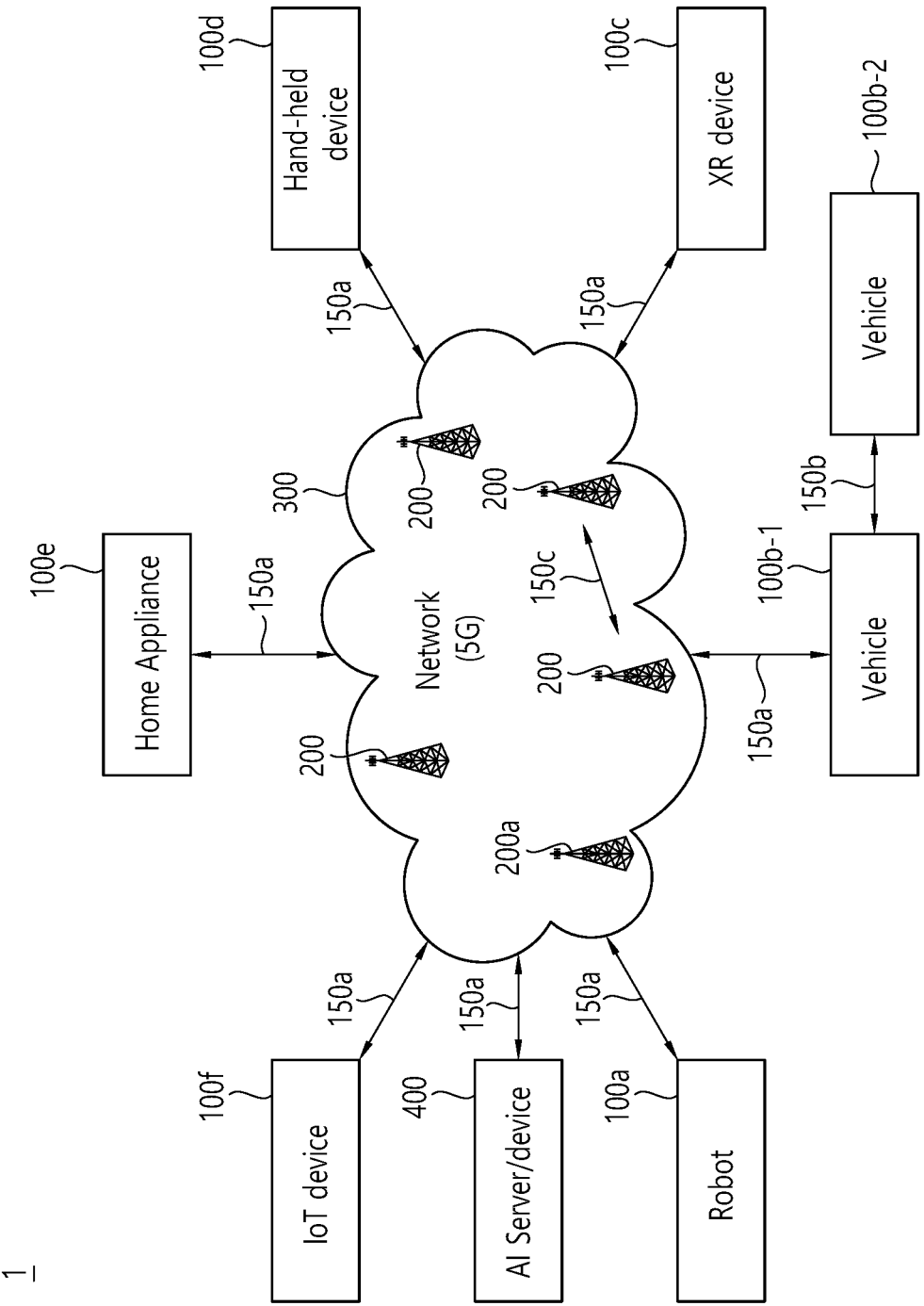
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH" and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (JAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
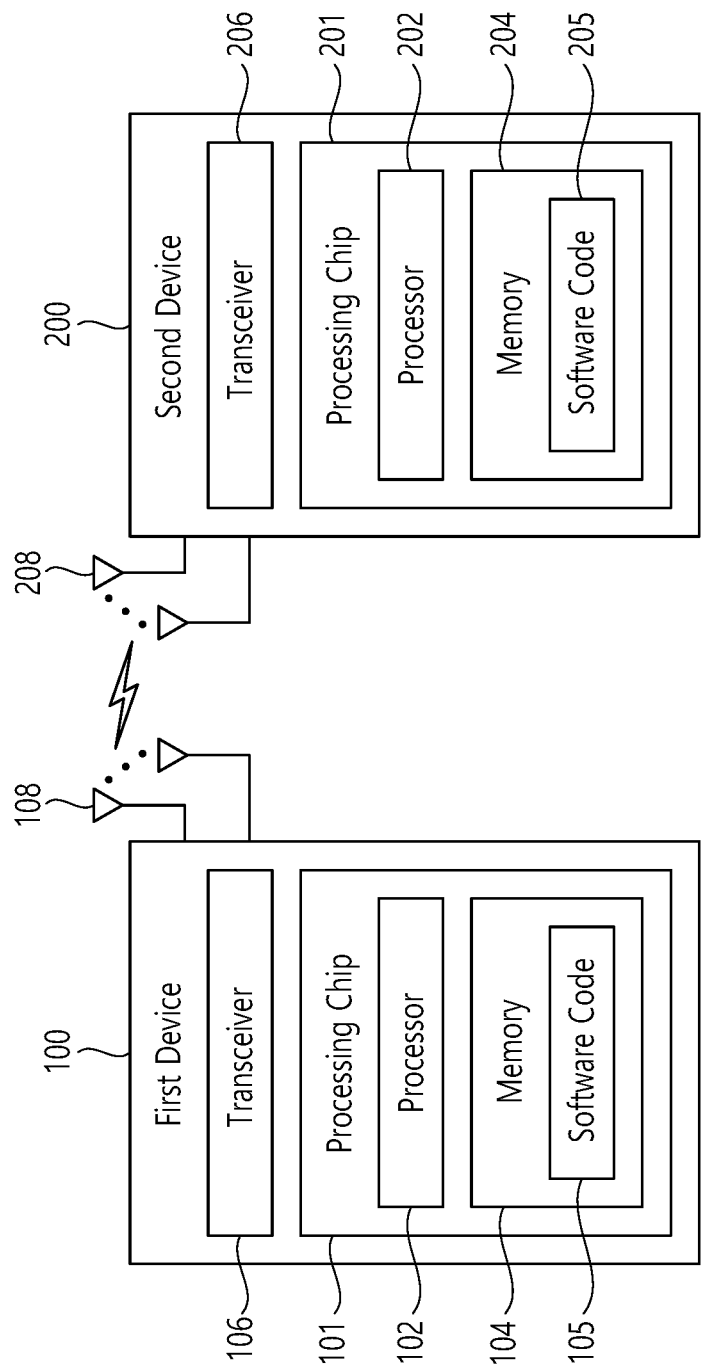
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
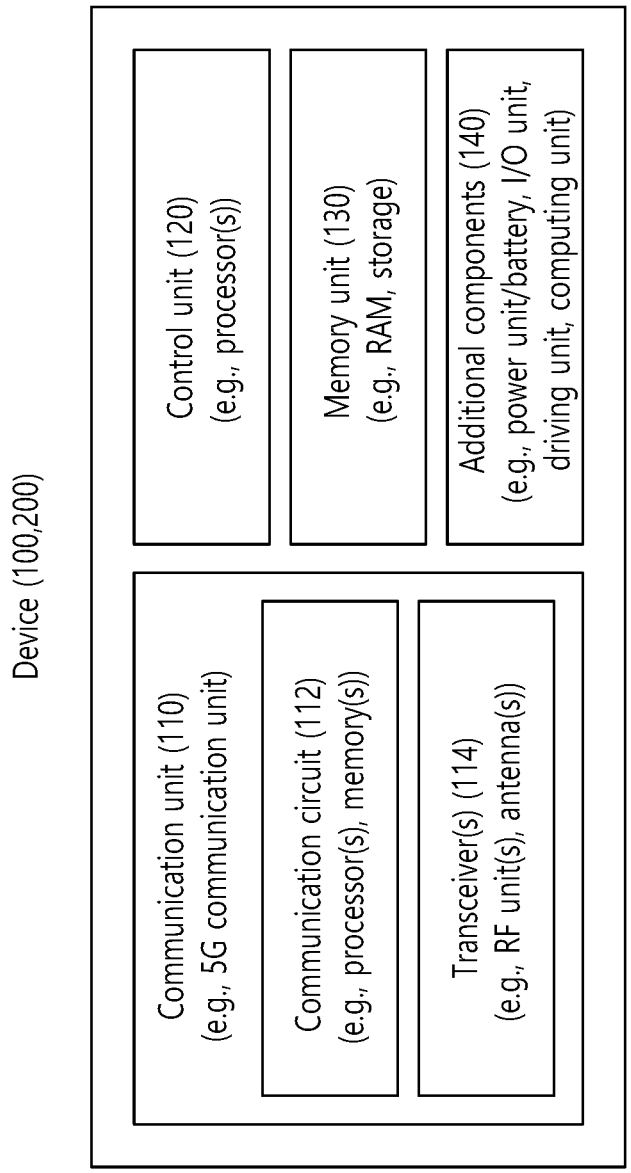
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
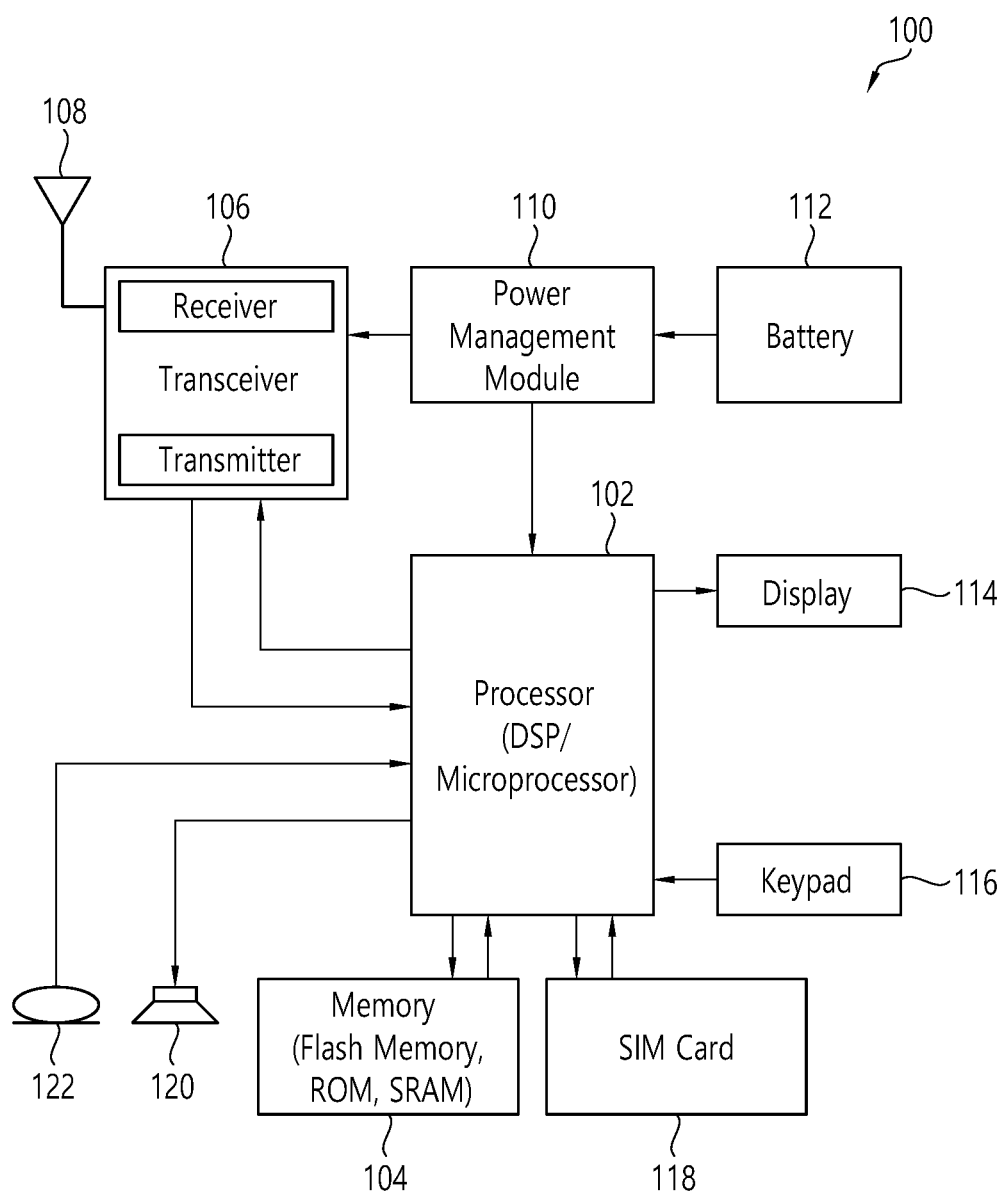
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

<Operating Band>

The LTE/LTE-A based cell operates in an Evolved Universal Terrestrial Radio Access (E-UTRA) operating band. And, the NR-based cell operates in a NR band. Here, the DC may be called as EN-DC.

The Table 3 is an example of E-UTRA operating bands.

TABLE 3

| E-UTRA Operating Band | Uplink (UL) operating band BS receive UE transmit FUL_low-FUL_high | Downlink (DL) operating band BS transmit UE receive FDL_low-FDL_high | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD2 |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD2 |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |

TABLE 3-continued

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD8 |
| 47 | 5855 MHz-5925 MHz | 5855 MHz-5925 MHz | TDD11 |
| 48 | 3550 MHz-3700 MHz | 3550 MHz-3700 MHz | TDD |
| 49 | 3550 MHz-3700 MHz | 3550 MHz-3700 MHz | TDD16 |
| 50 | 1432 MHz-1517 MHz | 1432 MHz-1517 MHz | TDD13 |
| 51 | 1427 MHz-1432 MHz | 1427 MHz-1432 MHz | TDD13 |
| 52 | 3300 MHz-3400 MHz | 3300 MHz-3400 MHz | TDD |
| 53 | 2483.5 MHz-2495 MHz | 2483.5 MHz-2495 MHz | TDD |
| ... | | | |
| 64 | | Reserved | |
| 65 | 1920 MHz-2010 MHz | 2110 MHz-2200 MHz | FDD |
| 66 | 1710 MHz-1780 MHz | 2110 MHz-2200 MHz | FDD4 |
| 67 | N/A | 738 MHz-758 MHz | FDD2 |
| 68 | 698 MHz-728 MHz | 753 MHz-783 MHz | FDD |
| 69 | N/A | 2570 MHz-2620 MHz | FDD2 |
| 70 | 1695 MHz-1710 MHz | 1995 MHz-2020 MHz | FDD10 |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD2 |
| 76 | N/A | 1427 MHz-1432 MHz | FDD2 |
| 85 | 698 MHz-716 MHz | 728 MHz-746 MHz | FDD |
| 87 | 410 MHz-415 MHz | 420 MHz-425 MHz | FDD |
| 88 | 412 MHz-417 MHz | 422 MHz-427 MHz | FDD |

An operating band in NR is as follows. Table 4 shows examples of operating bands on FR1. Operating bands shown in Table 4 is a reframing operating band that is transitioned from an operating band of LTE/LTE-A. This operating band may be referred to as FR1 operating band.

TABLE 4

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n13 | 777 MHz-787 MHz | 746 MHz-756 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n25 | 1850 MHz-1915 MHz | 1930 MHz-1995 MHz | FDD |
| n26 | 814 MHz-849 MHz | 859 MHz-894 MHz | FDD |
| n28 | 703 MHz-748 MHz | 758 MHz-803 MHz | FDD |
| n29 | N/A | 717 MHz-728 MHz | SDL |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n46 | 5150 MHz-5925 MHz | 5150 MHz-5925 MHz | TDD |
| n47 | 5855 MHz-5925 MHz | 5855 MHz-5925 MHz | TDD |
| n48 | 3550 MHz-3700 MHz | 3550 MHz-3700 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n53 | 2483.5 MHz-2495 MHz | 2483.5 MHz-2495 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2300 MHz | FDD |

TABLE 4-continued

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD |
| n91 | 832 MHz-862 MHz | 1427 MHz-1432 MHz | FDD |
| n92 | 832 MHz-862 MHz | 1432 MHz-1517 MHz | FDD |
| n93 | 880 MHz-915 MHz | 1427 MHz-1432 MHz | FDD |
| n94 | 880 MHz-915 MHz | 1432 MHz-1517 MHz | FDD |
| n95 | 2010 MHz-2025 MHz | N/A | SUL |
| n96 | 5925 MHz-7125 MHz | 5925 MHz-7125 MHz | TDD |
| n97 | 2300 MHz-2400 MHz | N/A | SUL |
| n98 | 1880 MHz-1920 MHz | N/A | SUL |

Table 5 shows examples of operating bands on FR2. The following table shows operating bands defined on a high frequency. This operating band is referred to as FR2 operating band.

TABLE 5

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 39500 MHz-43500 MHz | 39500 MHz-43500 MHz | TDD |
| n260 | 37000 MHz-40000 MHz | 37000 MHz-40000 MHz | TDD |
| n261 | 27500 MHz-283500 MHz | 27500 MHz-283500 MHz | TDD |

<Maximum Output Power>

Power class 1, 2, 3, and 4 are specified based on UE types as follows:

TABLE 6

| UE Power class | UE type |
|---|---|
| 1 | Fixed wireless access (FWA) UE |
| 2 | Vehicular UE |
| 3 | Handheld UE |
| 4 | High power non-handheld UE |

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

Carrier aggregation can also be classified into inter-band CA and intra-band CA. The inter-band CA is a method of aggregating and using each CC existing in different operating bands, and the intra-band CA is a method of aggregating and using each CC in the same operating band. In addition, the CA technology is more specifically, intra-band contiguous CA, intra-band non-contiguous CA and inter-band discontinuity. Non-Contiguous) CA.

Figure 5A:
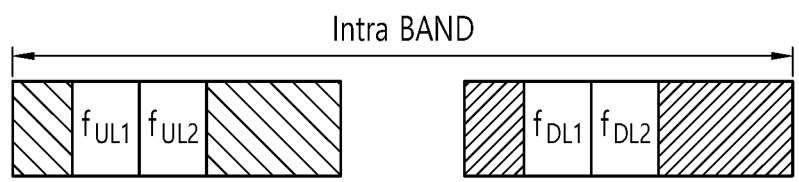
FIG. 5a illustrates a concept view of an example of intra-band contiguous CA.
Figure 5B:
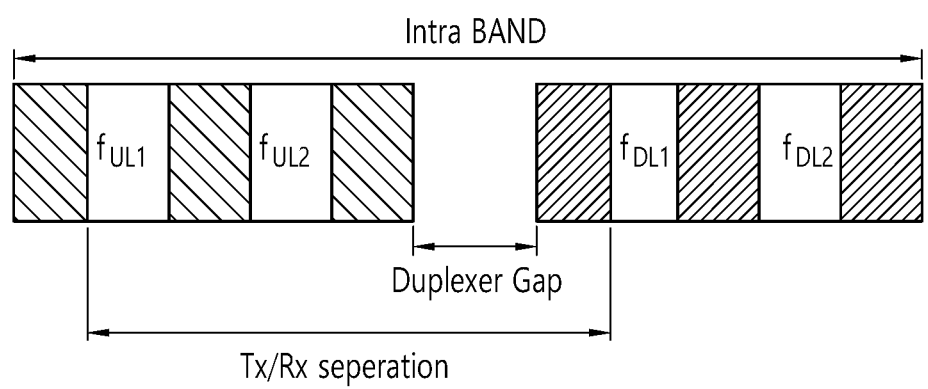
FIG. 5b illustrates a concept view of an example of intra-band non-contiguous CA.

FIG. 5a illustrates a concept view of an example of intra-band contiguous CA. FIG. 5b illustrates a concept view of an example of intra-band non-contiguous CA.

The CA may be split into the intra-band contiguous CA shown in FIG. 5a and the intra-band non-contiguous CA shown in FIG. 5b.

Figure 6A:
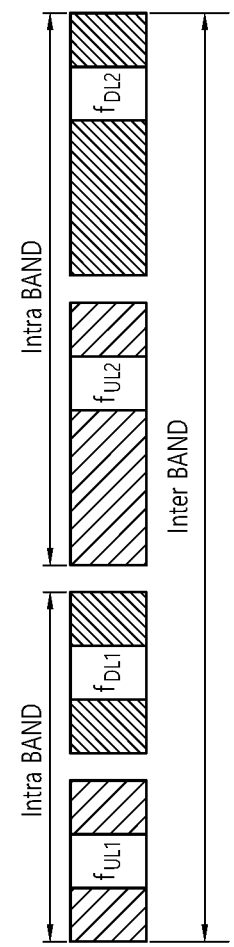
FIG. 6a illustrates a concept view of an example of a combination of a lower frequency band and a higher frequency band for inter-band CA.
Figure 6B:
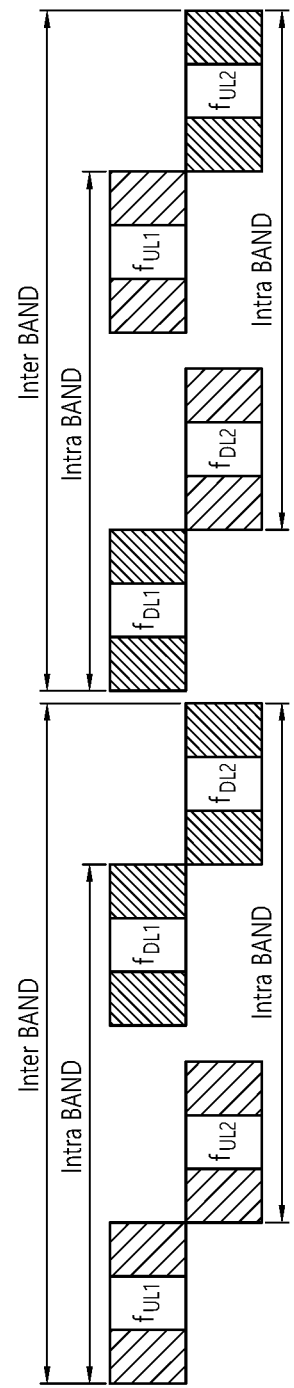
FIG. 6b illustrates a concept view of an example of a combination of similar frequency bands for inter-band CA.

FIG. 6a illustrates a concept view of an example of a combination of a lower frequency band and a higher frequency band for inter-band CA. FIG. 6b illustrates a concept view of an example of a combination of similar frequency bands for inter-band CA.

The inter-band carrier aggregation may be separated into inter-band CA between carriers of a low band and a high band having different RF characteristics of inter-band CA as shown in FIG. 6a and inter-band CA of similar frequencies that may use a common RF terminal per component carrier due to similar RF (radio frequency) characteristics as shown in FIG. 6b.

For inter-band carrier aggregation, a carrier aggregation configuration is a combination of operating bands, each supporting a carrier aggregation bandwidth class.

<Introduction of Dual Connectivity (DC)>

Recently, a scheme for simultaneously connecting UE to different base stations, for example, a macro cell base station and a small cell base station, is being studied. This is called dual connectivity (DC).

In DC, the eNodeB for the primary cell (Pcell) may be referred to as a master eNodeB (hereinafter referred to as MeNB). In addition, the eNodeB only for the secondary cell (Scell) may be referred to as a secondary eNodeB (hereinafter referred to as SeNB).

A cell group including a primary cell (Pcell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

Figure 7A:
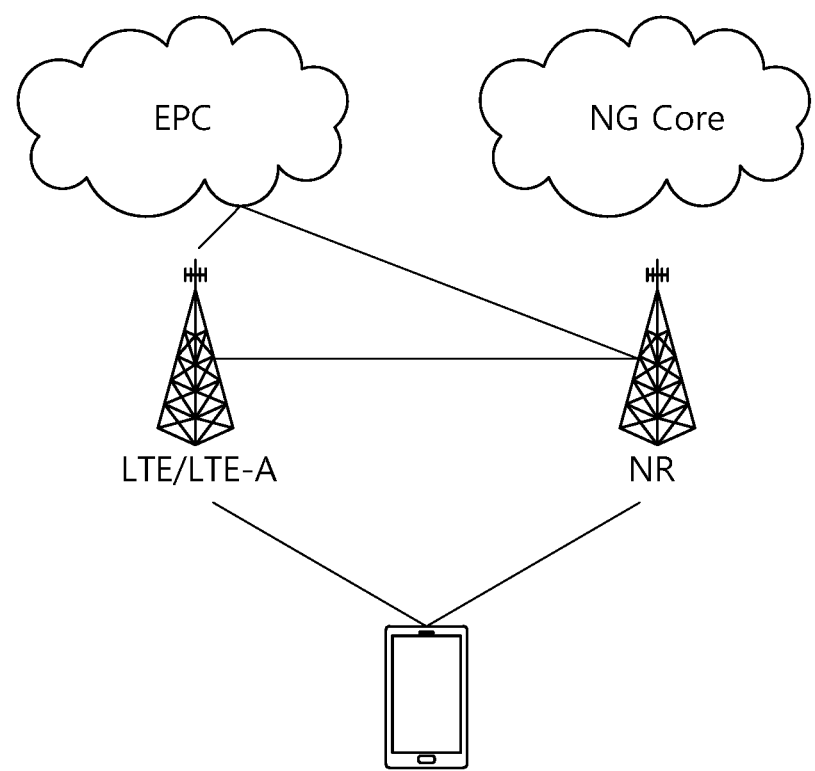
FIGS. 7a to 7c are exemplary diagrams illustrating exemplary architectures for services of the next generation mobile communication.
Figure 7B:
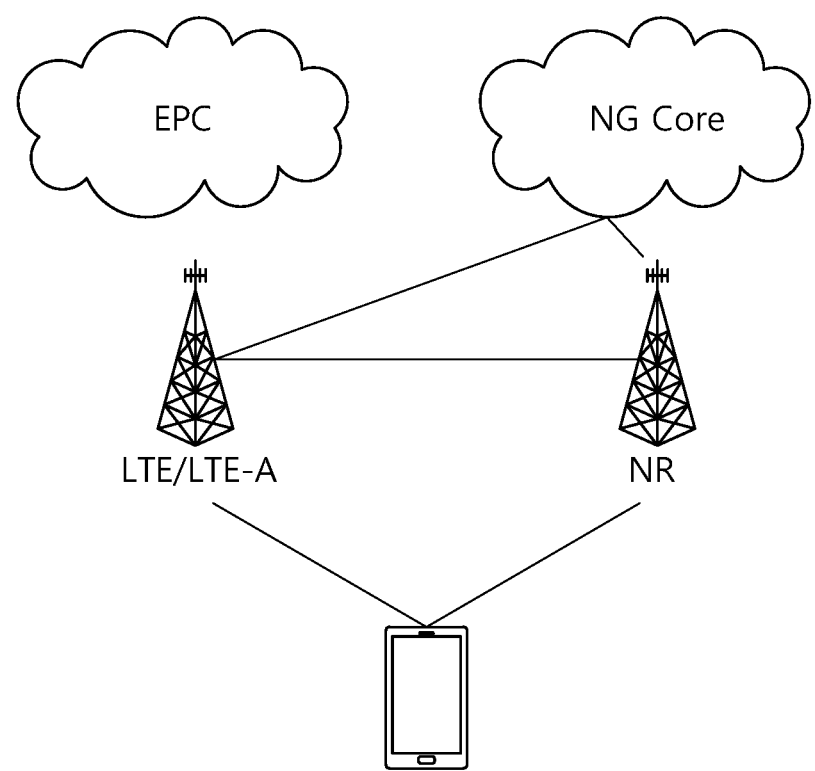
Figure 7C:
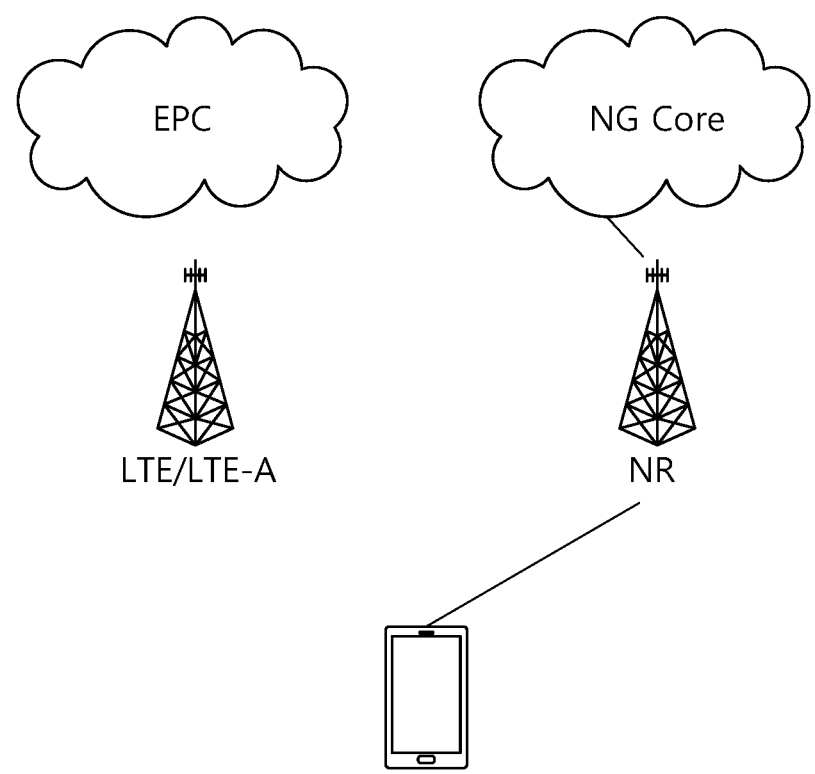

FIGS. 7a to 7c are exemplary diagrams illustrating exemplary architectures for services of the next generation mobile communication.

Referring to FIG. 7a, the UE is connected to LTE/LTE-A based cells and NR based cells in a dual connectivity (DC) manner.

The NR-based cell is connected to a core network for existing 4G mobile communication, that is, an evolved packet core (EPC).

Referring to FIG. 7b, unlike FIG. 7a, the LTE/LTE-A based cell is connected to a core network for the 5G mobile communication, that is, a next generation (NG) core network.

The service scheme based on the architecture as illustrated in FIGS. 7a and 7b is called non-standalone (NSA).

Referring to FIG. 7c, the UE is connected only to NR-based cells. The service method based on such an architecture is called standalone (SA).

On the other hand, in the NR, it may be considered that the reception from the base station uses a downlink subframe, and the transmission to the base station uses an uplink subframe. This method may be applied to paired spectra and unpaired spectra. A pair of spectra means that the two carrier spectra are included for downlink and uplink operations. For example, in a pair of spectra, one carrier may include a downlink band and an uplink band that are paired with each other.

Figure 8:
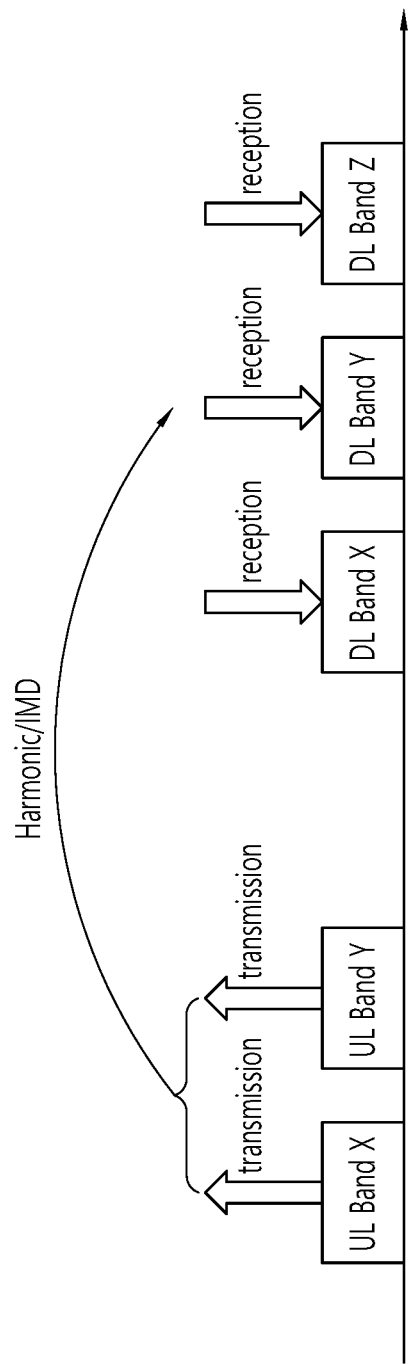
FIG. 8 illustrates an example of situation in which uplink signal transmitted via an uplink operating bands affects reception of a downlink signal via downlink operating bands.

FIG. 8 illustrates an example of situation in which uplink signal transmitted via an uplink operating bands affects reception of a downlink signal via downlink operating bands.

In FIG. 8, an Intermodulation Distortion (IMD) may mean amplitude modulation of signals containing two or more different frequencies, caused by nonlinearities or time variance in a system. The intermodulation between frequency components will form additional components at frequencies that are not just at harmonic frequencies (integer multiples) of either, like harmonic distortion, but also at the sum and difference frequencies of the original frequencies and at sums and differences of multiples of those frequencies.

Referring to FIG. 8, an example in which a CA is configured in a terminal is shown. For example, the terminal may perform communication through the CA based on three downlink operating bands (UL Band X, Y, Z) and two uplink operating bands (DL Band X, Y).

As shown in FIG. 8, in a situation in which three downlink operating bands are configured and two uplink operating bands are configured by the CA, the terminal may transmit an uplink signal through two uplink operating bands. In this case, a harmonics component and an intermodulation distortion (IMD) component occurring based on the frequency band of the uplink signal may fall into its own downlink band. That is, in the example of FIG. 8, when the terminal transmits the uplink signal, the harmonics component and the intermodulation distortion (IMD) component may occur, which may affect the downlink band of the terminal itself.

The terminal should be configured to satisfy a reference sensitivity power level (REFSENS) which is the minimum average power for each antenna port of the terminal when receiving the downlink signal.

When the harmonics component and/or IMD component occur as shown in the example of FIG. 8, there is a possibility that the REFSENS for the downlink signal may not be satisfied due to the uplink signal transmitted by the UE itself.

For example, the REFSENS may be set such that the downlink signal throughput of the terminal is 95% or more of the maximum throughput of the reference measurement channel. When the harmonics component and/or IMD component occur, there is a possibility that the downlink signal throughput is reduced to 95% or less of the maximum throughput.

Disclosure of the Present Disclosure

Therefore, it is determined whether the harmonics component and the IMD component of the terminal occur, and when the harmonics component and/or IMD component occur, the maximum sensitivity degradation (MSD) value is defined for the corresponding frequency band, so relaxation for REFSENS in the reception band may be allowed in the reception band due to its own transmission signal. Here, the MSD may mean the maximum allowed reduction of the REFSENS. When the MSD is defined for a specific operating band of the terminal where the CA or DC is configured, the REFSENS of the corresponding operating band may be relaxed by the amount of the defined MSD.

The disclosure of the present specification provides results of analysis about self-interference in a terminal configured with CA and NR EN-DC and amount of relaxation to sensitivity.

I. Reference Sensitivity

The reference sensitivity power level REFSENS is the minimum mean power applied to each one of the UE antenna ports for all UE categories, at which the throughput shall meet or exceed the requirements for the specified reference measurement channel.

For EN-DC, E-UTRA and NR single carrier, CA, and MIMO operation of REFSENS requirements defined apply to all downlink bands of EN-DC configurations listed, unless sensitivity degradation exception is allowed in this clause of this specification. Allowed exceptions specified in this clause also apply to any higher order EN-DC configuration combination containing one of the band combinations that exception is allowed for. Reference sensitivity exceptions are specified by applying maximum sensitivity degradation (MSD) into applicable REFSENS requirement. EN-DC REFSENS requirements shall be met for NR uplink transmissions using QPSK DFT-s-OFDM waveforms as defined. Unless otherwise specified UL allocation uses the lowest SCS allowable for a given channel BW. Limits on configured maximum output power for the uplink shall apply.

In case of intra-band EN-DC the receiver REFSENS requirements in this clause do not apply for 1.4 and 3 MHz E-UTRA carriers. For the case of inter-band EN-DC with a single carrier per cell group and multi-carrier per cell group, in addition to the E-UTRA and NR single carrier, CA, and MIMO operation of REFSENS requirements defined the REFSENS requirements specified therein also apply with both downlink carriers and both uplink carriers active unless sensitivity exceptions are allowed in this clause of this specification.

For inter-band EN-DC, the reference sensitivity requirement with both uplink carriers active is allowed to be verified for only a single inter-band EN-DC configuration per NR band.

For intra-band contiguous EN-DC configurations, the reference sensitivity power level REFSENS is the minimum mean power applied to each one of the UE antenna ports at which the throughput for the carrier(s) of the E-UTRA and NR CGs shall meet or exceed the requirements for the specified E-UTRA and NR reference measurement channels. The reference sensitivity requirements apply with all uplink carriers and all downlink carriers active for EN-DC configuration and Uplink EN-DC configuration, as supported by the UE. For EN-DC configurations where uplink is not available in either the MCG or the SCG or for EN-DC configurations where the UE only supports single uplink operation, reference sensitivity requirements apply with single uplink transmission. The downlink carrier(s) from the cell group with uplink shall be configured closer to the uplink operating band than any of the downlink carriers from the cell group without uplink.

Sensitivity degradation is allowed for Intra-band contiguous EN-DC configurations, the reference sensitivity is defined only for the specific uplink and downlink test points and E-UTRA and NR single carrier requirements do not apply.

Sensitivity degradation is allowed for a band if it is impacted by UL harmonic interference from another band part of the same EN-DC configuration. Reference sensitivity exceptions for the victim band (high) are specified with uplink configuration of the agressor band (low).

Sensitivity degradation is allowed for a band if it is impacted by receiver harmonic mixing due to another band part of the same EN-DC configuration. Reference sensitivity exceptions for the victim band (low) are specified with uplink configuration of the agressor band (high).

Sensitivity degradation is allowed for a band if it is impacted by UL of another band part of the same EN-DC configuration due to cross band isolation issues. Reference sensitivity exceptions for the victim band are specified with uplink configuration of the agressor band specified.

For EN-DC configurations in NR FR1 the UE may indicate capability of not supporting simultaneous dual uplink operation due to possible intermodulation interference overlapping in frequency to its own primary downlink channel bandwidth if
    the intermodulation order is 2;
    the intermodulation order is 3 when both operating bands are between 450 MHz-960 MHz or between 1427 MHz-2690 MHz In the case for EN-DC configurations in NR FR1 for which the intermodulation products caused by dual uplink operation do not interfere with its own primary downlink channel bandwidth as defined in Annex I the UE is mandated to operate in dual and triple uplink mode.

For these test points the reference sensitivity levels are relaxed by the amount of the parameter MSD.

II. Summary of Self-Interference Analysis

Below table summarizes the EN-DC band combinations with self-interference problems for 3DL/2UL EN-DC operation.

Table 7 shows summary of Self-interference analysis for LTE 1 band & NR 2 bands DL and 2 bands UL EN-DC operation.

TABLE 7

| Downlink band configuration | Uplink DC Configuration | Harmonic relation issues | intermodulation to own rx band | interference due to small frequency separation | MSD |
|---|---|---|---|---|---|
| DC_28_n40-n78 | DC_28A_n40A | 5th harmonic from B28 | 3rd & 4th IMDs | — | Harmonic issue was covered in DC_28A_n78A FFS FFS |
| | DC_28A_n78A | — | 3rd IMD | — | FFS |
| DC_1_n28-n77DC_1_n28-n77(2A) | DC_1A_n28A | 2nd harmonic from B1 | 3rd & 4th IMDs | — | Harmonic issue was covered in DC_1A_n77A Follow MSD on DC_1_n28-n78 with dual uplink_DC_1_n28 |

TABLE 7-continued

| Downlink band configuration | Uplink DC Configuration | Harmonic relation issues | intermodulation to own rx band | interference due to small frequency separation | MSD |
|---|---|---|---|---|---|
| | DC_1A_n77A | — | 5th IMD | — | Follow MSD on DC_1_n28-n78 with dual uplink DC_1_n78 |
| DC_3_n28-n77DC_3_n28-n77(2A) | DC_3A_n28A | 2nd harmonic from B3 and 5th harmonic from n28 | 3rd, 4th & 5th IMDs | — | Harmonic issue were covered in DC_3A_n77A or DC_28A_n77A FFS FFS FFS |
| | DC_3A_n77A | — | 3rd IMD | — | FFS |
| DC_8_n28-n77DC_8_n28-n77(2A) | DC_8A_n28A | 4th harmonic from B8 and 5th harmonic from n28 | 4th & 5th IMDs | — | Harmonic issue were covered in DC_8A_n77A or DC_28A_n77A FFS FFS |
| | DC_8A_n77A | — | 4th IMD | — | FFS |
| DC_42_n28-n77DC_42_n28-n77(2A) DC_42C_n28-n77(2A) | DC_42A_n28A DC_42C_n28A | 5th harmonic from n28 | 2nd IMD | — | Harmonic issue were covered in DC_28A_n77A FFS |
| DC_2_n38-n78 | DC_2A_n38A | 2nd harmonic from B2 | 3rd IMD | | Harmonic issue were covered in DC_2A_n78A FFS |
| | DC_2A_n78A | — | — | — | No issue |
| DC_2_n38-n66 | DC_2A_n38A | — | — | — | No issue |
| | DC_2A_n66A | — | — | — | No issue |
| DC_66_n38-n78 | DC_66A_n38A | 2nd harmonic from B66 | 3rd IMD | — | Harmonic issue were covered in DC_66A_n78A FFS |
| | DC_66A_n78A | — | — | — | No issue |
| DC_66_n38-n66 | DC_66A_n38A | — | — | — | No issue |
| | DC_66A_n66A2 | — | — | — | DC_66A_n66A, only allowed single uplink transmission. |
| DC_18_n3-n77 | DC_18A_n3A | 2nd harmonic from n3 and 4th &5th harmonic from B18 | 3rd & 5th IMDs | — | Harmonic issue were covered in DC_3A_n77A or DC_18A_n77A FFS FFS |
| | DC_18A_n77A | — | 3rd IMD | — | FFS |
| DC_28_n3-n77 | DC_28A_n3A | 2nd harmonic from n3 and 5th harmonic from B28 | 3rd & 4th IMDs | — | Harmonic issue were covered in DC_3A_n77A or DC_28A_n77A FFS FFS |
| | DC_28A_n77A | — | 3rd & 4th IMDs | — | FFS FFS |
| DC_41_n3-n77DC_41_n3-n77 | DC_41A_n3A DC_41C_n3A | 2nd harmonic from n3 | 3rd & 5th IMDs | — | Harmonic issue were covered in DC_3A_n77A FFS FFS |
| | DC_41A_n77ADC_41C_n77A | — | 3rd & 4th IMDs | — | FFS FFS |
| DC_41_n3-n78DC_41C_n3-n78 | DC_41A_n3A DC_41C_n3A | 2nd harmonic from n3 | 3rd IMD | — | Harmonic issue were covered in DC_3A_n78A FFS |
| | DC_41A_n78ADC_41C_n78A | — | 3rd & 4th IMDs | — | FFS FFS |

TABLE 7-continued

| Downlink band configuration | Uplink DC Configuration | Harmonic relation issues | intermodulation to own rx band | interference due to small frequency separation | MSD |
|---|---|---|---|---|---|
| DC_41_n28-n77DC_41C_n28-n77 | DC_41A_n28A DC_41C_n28A | 5th harmonic from n28 | 2nd, 3rd & 4th IMDs | — | Harmonic issue were covered in DC_28A_n77A FFS FFS FFS |
| | DC_41A_n77ADC_41C_n77A | — | 2nd & 3rd IMDs | — | FFS FFS |
| DC_41_n28-n78DC_41C_n28-n78 | DC_41A_n28A *192DC_41C_n28A | 5th harmonic from n28 | 2nd & 4th IMDs | — | Harmonic issue were covered in DC_28A_n77A FFS FFS |
| | DC_41A_n78ADC_41C_n78A | — | 2nd & 5th IMDs | — | FFS FFS |
| DC_1_n41-n78 | DC_1A_n41A | — | 3rd, 4th & 5th IMDs | — | FFS FFS FFS |
| | DC_1A_n78A | — | 4th IMD | — | FFS |
| DC_3_n41-n78 | DC_3A_n41A | 2nd harmonic from B3 | 3rd IMD | — | Harmonic issue were covered in DC_3A_n78A FFS |
| | DC_3A_n78A | — | — | — | No issue |
| DC_20_n41-n78 | DC_20A_n41A | 4th harmonic from B20 | 2nd & 4th IMDs | — | Harmonic issue were covered in DC_20A_n78A FFS FFS |
| | DC_20A_n78A | 3rd harmonic from B20 | 2nd IMD | — | Harmonic issue were covered in DC_20A_n41A FFS |
| DC_1_n75-n78DC_1_n75-n78(2A) | DC_1A_n78A | — | 2nd & 5th IMDs | | FFS FFS |
| DC_3_n75-n78DC_3_n75-n78(2A) | DC_3A_n78A | — | 2nd, 4th & 5th IMDs | | FFS FFS FFS |
| DC_20_n75-n78DC_20_n75-n78(2A) | DC_20A_n78A | 2nd harmonic from B20 | — | | Harmonic issue were covered in DC_20A_n75A |
| DC_20_n78-n92DC_20_n78(2A)-n92 | DC_20A_n78A DC_20A_n92A_ULS UP-TDM-n78A | 2nd harmonic from B20 | — | | Harmonic issue were covered in DC_20A_n92A |
| DC_3_n34-n258 | DC_3A_n34A | High order harmonic from B3 or n34 | — | — | No issue |
| | DC_3A_n258A | — | — | — | No issue |
| DC_3_n40-n258 | DC_3A_n40A | High order harmonics from B3 or n40 | — | — | No issue |
| | DC_3A_n258A | — | — | — | No issue |
| DC_3_n41-n258 | DC_3A_n41A | High order harmonics from B3 or n41 | — | — | No issue |
| | DC_3A_n258A | — | — | — | No issue |
| DC_8_n34-n258 | DC_8A_n34A | High order harmonics from B8 or n34 | — | — | No issue |
| | DC_8A_n258A | — | — | — | No issue |
| DC_8_n40-n258 | DC_8A_n40A | High order harmonics from B8 or n40 | — | — | No issue |
| | DC_8A_n258A | — | — | — | No issue |
| DC_8_n41-n258 | DC_8A_n41A | High order harmonics from B8 or n41 | — | — | No issue |
| | DC_8A_n258A | — | — | — | No issue |
| DC_8_n79-n258 | DC_8A_n79A | High order harmonics from B8 or n79 | — | — | No issue |
| | DC_8A_n258A | — | — | — | No issue |
| DC_39_n40-n258 | DC_39A_n40A | High order harmonics from B39 or n40 | — | — | No issue |
| | DC_39A_n258A | — | — | — | No issue |
| DC_39_n41-n258 | DC_39A_n41A | High order harmonics from B39 or n41 | — | — | No issue |
| | DC_39A_n258A | — | — | — | No issue |

TABLE 7-continued

| Downlink band configuration | Uplink DC Configuration | Harmonic relation issues | intermodulation to own rx band | interference due to small frequency separation | MSD |
|---|---|---|---|---|---|
| DC_39_n79-n258 | DC_39A_n79A | High order harmonics from B39 or n79 | — | — | No issue |
| | DC_39A_n258A | — | — | — | No issue |
| DC_40_n41-n258 | DC_40A_n41A | High order harmonics from B40 or n41 | — | — | No issue |
| | DC_40A_n258A | — | — | — | No issue |
| DC_40_n79-n258 | DC_40A_n79A | High order harmonics from B40 or n79 | — | — | No issue |
| | DC_40A_n258A | — | — | — | No issue |
| DC_41_n79-n258 | DC_41A_n79A | High order harmonics from B41 or n79 | — | — | No issue |
| | DC_41A_n258A | — | — | — | No issue |
| DC_1_n28-n257DC_1_n28-n257I | DC_1A_n28A | High order harmonics from B1 or n28 | — | — | No issue |
| | DC_1A_n257A | — | — | — | No issue |
| DC_3_n28-n257DC_3_n28-n257I | DC_3A_n28A | High order harmonics from B3 or n28 | — | — | No issue |
| | DC_3A_n257A | — | — | — | No issue |
| DC_41_n3-n257DC_41_n3-n257I DC_41C_n3-n257DC_41C_n3-n257I | DC_41A_n3A DC_41C_n3A | High order harmonics from B41 or n3 | — | — | No issue |
| | DC_41A_n257ADC_41A_n257I DC_41C_n257A DC_41C_n257I | — | — | — | No issue |
| DC_41_n28-n257DC_41C_n28-n257DC_41_n28-n257I DC_41C_n28-n257I | DC_41A_n28A DC_41C_n28A | High order harmonics from B41 or n28 | — | — | No issue |
| | DC_41A_n257ADC_41C_n257A DC_41A_n257I DC_41C_n257I | — | — | — | No issue |
| DC_41_n77-n257DC_41C_n77-n257 DC_41_n77-n257I DC_41C_n77-n257I | DC_41A_n77A DC_41C_n77A | High order harmonics from B41 or n77 | — | — | No issue |
| | DC_41A_n257ADC_41C_n257A DC_41A_n257I DC_41C_n257I | — | — | — | No issue |
| DC_7_n1-n257DC_7-7_n1-n257 | DC_7A_n1A | High order harmonics from B7 or n1 | — | — | No issue |
| | DC_7A_n257A | — | — | — | No issue |

Note 1:
These band combinations should be completed the dual uplink EN-DC firstly Note 2:
only single switched UL is supported For the MSD analysis of these 3DL/2UL EN-DC NR UE, it is assumed that the parameters and attenuation levels based on current UE RF FE components as shown in below tables. Table 8 shows the RF component isolation parameters (e.g., UE RF Front-end component parameters) to derive MSD level at sub-6 GHz.

TABLE 8

| UE ref. architecture Component | Triplexer-Diplexer Architecture w/single ant. DC_28A_n40A-n78A, DC_3A_n28A-n77A DC_8A_n28A-n77A, DC_42A_n28A-n77A DC_2A_n38A-n78A, DC_66A_n38A-n78A DC_18A_n3A-n77A, DC_28A_n3A-n77A DC_41A_n3A-n77A, DC_41A_n28A-n77A DC_20A_n41A-n78A, DC_1A_n75A-n78A DC_3A_n75A-n78A | | | | Cascaded Diplexer Architecture w/single ant. DC_7A_n8A-n40A | | | |
|---|---|---|---|---|---|---|---|---|
| | IP2 (dBm) | IP3 (dBm) | IP4 (dBm) | IP5 (dBm) | IP2 (dBm) | IP3 (dBm) | IP4 (dBm) | IP5 (dBm) |
| Ant. Switch | 112 | 68 | 55 | 55 | 112 | 68 | 55 | 55 |
| Triplexer | 110 | 72 | 55 | 52 | | | | |
| Quadplexer | | | | | 112 | 72 | 55 | 52 |
| Diplexer | 115 | 87 | 55 | 55 | 115 | 87 | 55 | 55 |
| Duplexer | 100 | 75 | 55 | 53 | 100 | 75 | 55 | 53 |
| PA Forward | 28.0 | 32 | 30 | 28 | 28.0 | 32 | 30 | 28 |
| PA Reversed | 40 | 30.5 | 30 | 30 | 40 | 30.5 | 30 | 30 |
| LNA | 10 | 0 | 0 | −10 | 10 | 0 | 0 | −10 |

Table 9 shows the isolation levels according to the RF component (e.g., UE RF Front-end component isolation parameters).

TABLE 9

| Isolation Parameter | Value (dB) | Comment |
|---|---|---|
| Antenna to Antenna | 10 | Main antenna to diversity antenna |
| PA (out) to PA (in) | 60 | PCB isolation (PA forward mixing) |
| Triplexer | 20 | High/low band isolation |
| Diplexer | 25 | High/low band isolation |
| PA (out) to PA (out) | 60 | L-H/H-L cross-band |
| PA (out) to PA (out) | 50 | H-H cross-band |
| LNA (in) to PA (out) | 60 | L-H/H-L cross-band |
| LNA (in) to PA (out) | 50 | H-H cross-band |
| Duplexer | 50 | Tx band rejection at Rx band |

Based on these assumptions, the present disclosure proposes the MSD levels as below.

Table 10 shows a proposed MSD test configuration and results by IMD problems

TABLE 10

| DC bands | UL DC | IMD | | UL Fc (MHz) | UL BW (MHz) | UL RB # | DL Fc (MHz) | DL BW (MHz) | MSD (dB) |
|---|---|---|---|---|---|---|---|---|---|
| DC_7A_n8A-n40A | 7 | IMD5 | $\|2*f_{B7} - 3*f_{n8}\|$ | 2530 | 5 | 25 | 2650 | 5 | N/A |
| | n8 | | | 905 | 5 | 25 | 950 | 5 | |
| | n40 | | | 2345 | 5 | 25 | 2345 | 5 | 3.0 |
| DC_28A_n40A-n78A | 28 | IMD3 | $\|2*f_{B28} + f_{n40}\|$ | 733 | 5 | 25 | 788 | 5 | N/A |
| | n40 | | | 2320 | 5 | 25 | 2320 | 5 | |
| | n78 | | | 3786 | 10 | 50 | 3786 | 10 | 14.4 |
| | 28 | IMD3 | $\|2*f_{B28} - f_{n78}\|$ | 733 | 5 | 25 | 788 | 5 | N/A |
| | n78 | | | 3786 | 10 | 50 | 3786 | 10 | |
| | n40 | | | 2320 | 5 | 25 | 2320 | 5 | 15.8 |
| DC_3A_n28A-n77A | 3 | IMD3 | $\|2*f_{B3} + f_{n28}\|$ | 1720 | 5 | 25 | 1815 | 5 | N/A |
| | n28 | | | 733 | 5 | 25 | 788 | 5 | |
| | n77 | | | 4173 | 10 | 50 | 4173 | 10 | 15.9 |
| | 3 | IMD3 | $\|2*f_{B3} - f_{n77}\|$ | 1712.5 | 5 | 25 | 1807.5 | 5 | N/A |
| | n77 | | | 4195 | 10 | 50 | 4195 | 10 | |
| | n28 | | | 715 | 5 | 25 | 770 | 5 | 15.3 |

TABLE 10-continued

| DC bands | UL DC | IMD | IMD | UL Fc (MHz) | UL BW (MHz) | UL RB # | DL Fc (MHz) | DL BW (MHz) | MSD (dB) |
|---|---|---|---|---|---|---|---|---|---|
| DC_8A_n28A-n77A | 8 | IMD4 | $|3*f_{B8} + f_{n28}|$ | 910 | 5 | 25 | 955 | 5 | N/A |
| | n28 | | | 743 | 5 | 25 | 798 | 5 | |
| | n77 | | | 3473 | 10 | 50 | 3473 | 10 | 10.3 |
| | 8 | IMD4 | $|3*f_{B8} - f_{n77}|$ | 910 | 5 | 25 | 955 | 5 | N/A |
| | n77 | | | 3495 | 10 | 50 | 3495 | 10 | |
| | n28 | | | 710 | 5 | 25 | 765 | 5 | 11.6 |
| DC_42A_n28A-n77A | 42 | IMD2 | $|f_{B42} + f_{n28}|$ | 3410 | 5 | 25 | 3410 | 5 | N/A |
| | n28 | | | 733 | 5 | 25 | 788 | 5 | |
| | n77 | | | 4143 | 10 | 50 | 4143 | 10 | 29.2 |
| DC_2A_n38A-n78A | 2 | IMD3 | $|f_{B2} - 2*f_{n38}|$ | 1870 | 5 | 25 | 1950 | 5 | N/A |
| | n38 | | | 2610 | 5 | 25 | 2610 | 5 | |
| | n78 | | | 3350 | 10 | 50 | 3350 | 10 | 14.8 |
| DC_66A_n38A-n78A | 66 | IMD3 | $|f_{B66} - 2*f_{n38}|$ | 1760 | 5 | 25 | 2160 | 5 | N/A |
| | n38 | | | 2610 | 5 | 25 | 2610 | 5 | |
| | n78 | | | 3460 | 10 | 50 | 3460 | 10 | 15.0 |
| DC_18A_n3A-n77A | 18 | IMD3 | $|2*f_{B18} + f_{n3}|$ | 820 | 5 | 25 | 865 | 5 | N/A |
| | n3 | | | 1770 | 5 | 25 | 1865 | 5 | |
| | n77 | | | 3410 | 10 | 50 | 3410 | 10 | 16.3 |
| | 18 | IMD3 | $|2*f_{B18} - f_{n77}|$ | 820 | 5 | 25 | 865 | 5 | N/A |
| | n77 | | | 3505 | 10 | 50 | 3505 | 10 | |
| | n3 | | | 1770 | 5 | 25 | 1865 | 5 | 15.7 |
| DC_28A_n3A-n77A | 28 | IMD3 | $|f_{B28} + 2*f_{n3}|$ | 733 | 5 | 25 | 788 | 5 | N/A |
| | n3 | | | 1720 | 5 | 25 | 1815 | 5 | |
| | n77 | | | 4173 | 10 | 50 | 4173 | 10 | 15.9 |
| | 28 | IMD3 | $|2*f_{B28} - f_{n77}|$ | 735 | 5 | 25 | 790 | 5 | N/A |
| | n77 | | | 3320 | 10 | 50 | 3320 | 10 | |
| | n3 | | | 1755 | 5 | 25 | 1850 | 5 | 17.0 |
| DC_41A_n3A-n77A | 41 | IMD3 | $|2*f_{B41} - f_{n3}|$ | 2580 | 5 | 25 | 2580 | 5 | N/A |
| | n3 | | | 1720 | 5 | 25 | 1815 | 5 | |
| DC_41A_n3A-n78A | n77/n78 | | | 3440 | 10 | 50 | 3440 | 10 | 16.8 |
| | 41 | IMD3 | $|2*f_{B41} - f_{n77}|$ | 2620 | 5 | 25 | 2620 | 5 | N/A |
| | n77/n78 | | | 3400 | 10 | 50 | 3400 | 10 | |
| | n3 | | | 1745 | 5 | 25 | 1840 | 5 | 16.4 |
| DC_41A_n28A-n77A | 41 | IMD2 | $|f_{B41} + f_{n28}|$ | 2580 | 5 | 25 | 2580 | 5 | N/A |
| | n28 | | | 743 | 5 | 25 | 798 | 5 | |
| DC_41A_n28A-n78A | n77/n78 | | | 3323 | 10 | 50 | 3323 | 10 | 28.2 |
| | 41 | IMD2 | $|f_{B41} - f_{n77}|$ | 2642 | 5 | 25 | 2642 | 5 | N/A |
| | n77/n78 | | | 3440 | 10 | 50 | 3440 | 10 | |
| | n28 | | | 743 | 5 | 25 | 798 | 5 | 30.8 |
| DC_1A_n41-n78A | 1 | IMD3 | $|f_{B1} - 2*f_{n41}|$ | 1930 | 5 | 25 | 2120 | 5 | N/A |
| | n41 | | | 2650 | 5 | 25 | 2650 | 5 | |
| | n78 | | | 3370 | 10 | 50 | 3370 | 10 | 16.8 |
| | 1 | IMD4 | $|3*f_{B1} - f_{n78}|$ | 1970 | 5 | 25 | 2160 | 5 | N/A |
| | n78 | | | 3400 | 10 | 50 | 3400 | 10 | |
| | n41 | | | 2510 | 5 | 25 | 2510 | 5 | 11.0 |
| DC_3A_n41A-n78A | 3 | IMD3 | $|2*f_{n41} - f_{B3}|$ | 1720 | 5 | 25 | 1815 | 5 | N/A |
| | n41 | | | 2580 | 5 | 25 | 2580 | 5 | |
| | n78 | | | 3440 | 10 | 50 | 3440 | 10 | 16.8 |
| DC_20A_n41A-n78A | 20 | IMD2 | $|f_{B20} + f_{n41}|$ | 837 | 5 | 25 | 796 | 5 | N/A |
| | n41 | | | 2650 | 5 | 25 | 2650 | 5 | |
| | n78 | | | 3487 | 10 | 50 | 3487 | 10 | 27.9 |
| | 20 | IMD2 | $|f_{B20} - f_{n78}|$ | 837 | 5 | 25 | 796 | 5 | N/A |
| | n78 | | | 3370 | 10 | 50 | 3370 | 10 | |
| | n41 | | | 2533 | 5 | 25 | 2533 | 5 | 28.8 |
| DC_1A_n75A-n78A | 1 | IMD2 | $|f_{B1} - f_{n78}|$ | 1930 | 5 | 25 | 2120 | 5 | N/A |
| | n78 | | | 3400 | 10 | 50 | 3400 | 10 | |
| | n75 | | | — | — | — | 1470 | 5 | 29.0 |
| DC_3A_n75A-n78A | 3 | IMD2 | $|f_{B3} - f_{n78}|$ | 1782.5 | 5 | 25 | 1877.5 | 5 | N/A |
| | n78 | | | 3305 | 10 | 50 | 3305 | 10 | |
| | n75 | | | — | — | — | 1514.5 | 5 | 10.0 |

Offset of MSD values in table 10 is ±α, and α may be 0, 0.1, 0.2, 0.3, 0.4, 0.5, 0.6, 0.7, . . . , 2.7.

III. Self-Interference Analysis for Other NR-NR CA and EN-DC UE

Parameters of this specification are same with the above section I. If a chipset support for LTE and NR, characteristic of equal bands (e.g., LTE band and 1 and NR band n1) is equal.

TABLE 11

| NR-NR CA band combinations | UL DC | Desense Problem | Note |
|---|---|---|---|
| CA__n3-n28-n77 | CA__n3-n28 | 3rd, 4th & 5th IMD into n77 | Not specified |
| | CA__n3-n77 | 3rd IMD into n28 | Already specified |
| | CA__n28-n77 | 3rd IMD into n3 | Already specified |

This self desense problem is same with affection by IMD3 of dual uplink DC_3 A_n28A in DC_3 A_n28A-n77A, which is recited in section I that may be reused. That is, below MSD level was advised in EN-DC_3 A_n28A-n77A, the below MSD level may be used in NR-CA_n3A-n28A-n78A.

TABLE 12

| NR-CA__n3A_n28A-n77A | n3 | IMD3 | $\|2^*f_{n3} + f_{n28}\|$ | 1720 | 5 | 25 | 1815 | 5 | N/A |
|---|---|---|---|---|---|---|---|---|---|
| | n28 | | | 733 | 5 | 25 | 788 | 5 | |
| | n77 | | | 4173 | 10 | 50 | 4173 | 10 | 15.9 |

Offset of MSD values in table 12 is ±α, and α may be 0, 0.1, 0.2, 0.3, 0.4, 0.5, 0.6, 0.7, . . . , 2.7.

Table 13 is result of analyzing self desense about LTE (1 band)+NR (1band) DC combination.

TABLE 13

| EN-DC band combinations | ULDC | Desense Problem | Note |
|---|---|---|---|
| DC__11A__n28A | DC__11A__n28A | IMD4 into Band 11 DL | Not specified |
| | | IMD4 into NR Band n28 DL | Not specified |

Table 14 is based on UE front end device characteristic and side lobe impact of IMD4.

TABLE 14

| NR or E-UTRA Band/Channel bandwidth/NRB/MSD | | | | | | | | |
|---|---|---|---|---|---|---|---|---|
| a)EN-DC b)Configuration | EUTRA or NR band | UL Fc (MHz) | UL/DL BW (MHz) | UL LCRB | DL Fc (MHz) | MSD (dB) | Duplex mode | IMD order |
| CA_11A-n28A | 11 | 1442 | 5 | 25 | 1490 | 1.2 dB | FDD | IMD4 $\|2^*f_{B11} - 2^*f_{n28}\|$ |
| | n28 | 705.5 | 5 | 25 | 760.5 | N/A | FDD | N/A |
| | 11 | 1430.5 | 5 | 25 | 1478.5 | N/A | FDD | N/A |
| | n28 | 743 | 5 | 25 | 798 | 10.4 dB | FDD | IMD4 |

Offset of MSD values in table 14 is ±α, and α may be 0, 0.1, 0.2, 0.3, 0.4, 0.5, 0.6, 0.7, . . . , 2.7.

Because frequency range made by frequency combination of DC_11+n28 affect to DL Fc of B11(=1490 MHz) in 7 MHz away, IMD3 in band 11 demand low MSD value for affection of side lobe impact unlike with directly affection of NR band n28.

On the other hand, because impulse value of IMD4 in n28 DL is 798.5 MHz, higher affection occurs.

Result of analyzing UE's MSD about EN-DC frequency combination requested by KDDI is table 15.

TABLE 15

| EN-DC band combinations | UL DC | Desense Problem | Note |
|---|---|---|---|
| DC_18A-41A_n3A | DC_18A_n3A | IMD3 into Band 41 reception | Not specified |
| DC_18A-41C_n3A | DC_41A_n3A | IMD2, IMD3 into Band 18 DL | Not specified |
| DC_18A-41A_n77A | DC_18A_n77A | No IMD issue into B41 | Not needed |
| DC_18A-41C_n77A | DC_41A_n77A | IMD5 into Band 18 DL | Not specified |
| DC_18A-41A_n78A | DC_18A_n78A | No IMD issue into B41 | Not needed |
| DC_18A-41C_n78A | DC_41A_n78A | IMD5 into Band 18 DL | Not specified |

MSD test configuration and MSD values in table 16 are based on UE front end device characteristic and each characteristic generated by IMDproduct. Especially, MSD test configuration and MSD value of DC_18 A-41A_n77A may be applied equal to DC_18 A-41A_n78A.

TABLE 16

| DC bands | UL DC | IMD | | UL Fc (MHz) | UL BW (MHz) | UL RB # | DL Fc (MHz) | DL BW (MHz) | MSD (dB) |
|---|---|---|---|---|---|---|---|---|---|
| DC_18A-41A_n3A | B18 | IMD3 | $|f_{B18} - 2f_{n3}|$ | 820 | 5 | 25 | 865 | 5 | N/A |
| | n3 | | | 1725 | 5 | 25 | 1820 | 5 | |
| DC_18A-41C_n3A | B41 | | | 2630 | 5 | 25 | 2630 | 5 | 16.0 |
| | B41 | IMD2 | $|f_{B41} - f_{n3}|$ | 2630 | 5 | 25 | 2630 | 5 | N/A |
| | n3 | | | 1765 | 5 | 25 | 1860 | 5 | |
| | B18 | | | 820 | 5 | 25 | 865 | 5 | 28.9 |
| DC_18A-41A_n77A | B41 | IMD5 | $|3*f_{B41} - 2*f_{n77}|$ | 2640 | 5 | 25 | 2640 | 5 | N/A |
| DC_18A-41C_n77A | n77/n78 | | | 3527.5 | 10 | 50 | 3527.5 | 10 | |
| DC_18A-41A_n78A | B18 | | | 820 | 5 | 25 | 865 | 5 | 3.4 |
| DC_18A-41C_n78A | | | | | | | | | |

Offset of MSD values in table 16 is ±α, and α may be 0, 0.1, 0.2, 0.3, 0.4, 0.5, 0.6, 0.7, . . . , 2.7.

IV. Proposals for MSD Values by the Analysis

Hereinafter, each combination of DC bands described in Table 10 will be described in detail, by referring to FIG. 9 to FIG. 21.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

IV-1. Proposed MSD level for DC_7 A_n8A-n40A.

Figure 9:
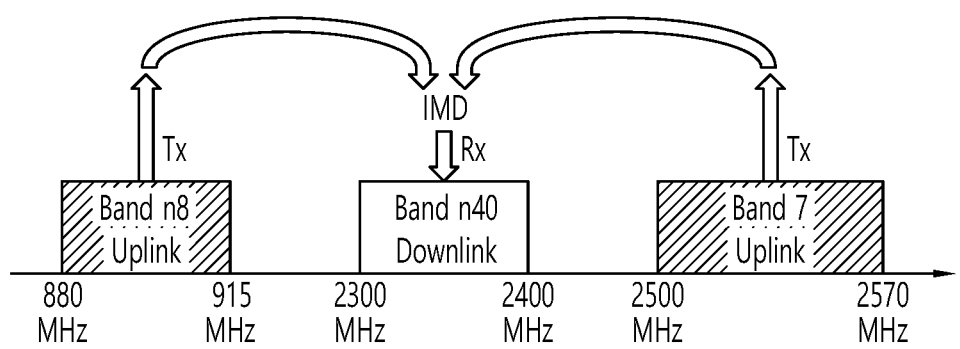
FIG. 9 illustrates exemplary IMD by a combination of band n8, n40 and 7.

FIG. 9 illustrates exemplary IMD by a combination of band n8, n40 and 7.

There are IMD5 products produced by Band n8 and 7 that impact the reference sensitivity of NR n40. For example, as shown in FIG. 9, if the UE transmits uplink signals via uplink bands of operating bands n8 and 7, IMD products are produced and then a reference sensitivity in operating band n40 is degraded. Therefore, a value of MSD is needed to apply the reference sensitivity.

Table 10 shows MSD exception for Scell due to dual uplink operation for EN-DC_7 A_n8A-n40A.

IV-2. Proposed MSD level for DC_28A_n40A-n78A

There is IMD3 products produced by Band 28 and n40 that impact the reference sensitivity of NR n78.

In addition, there is IMD3 product produced by Band 28 and n78 that impact the reference sensitivity of NR Band n40. The required MSD are shown in Table 10.

Table 10 shows MSD exception for Scell due to dual uplink operation for EN-DC_28 A_n40A-n78A.

IV-3. Proposed MSD level for DC_3 A_n28A-n77A

There is IMD3 products produced by Band 3 and n28 that impact the reference sensitivity of NR n77.

In addition, there is IMD3 product produced by Band 3 and n77 that impact the reference sensitivity of NR Band n28. The required MSD are shown in Table 10.

Table 10 shows MSD exception for Scell due to dual uplink operation for EN-DC_3 A_n28A-n77A.

IV-4. Proposed MSD level for DC_8 A_n28A-n77A

Figure 10A:
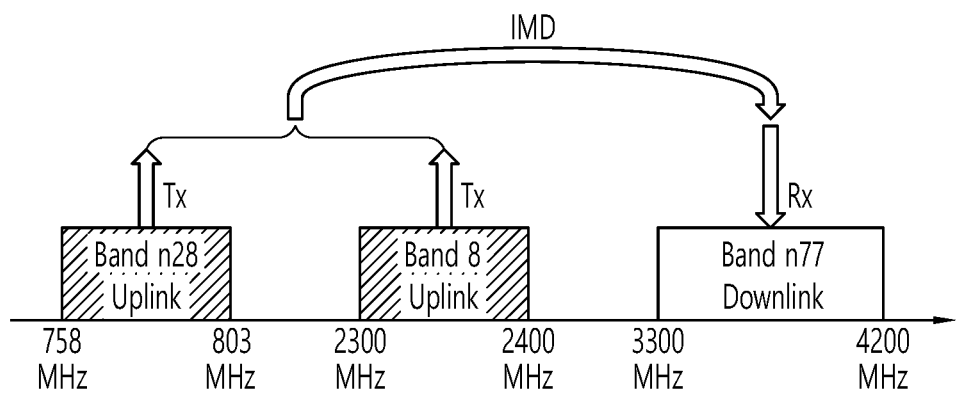
FIGS. 10a and 10b illustrate exemplary IMD by a combination of bands 8, n28 and n77.
Figure 10B:
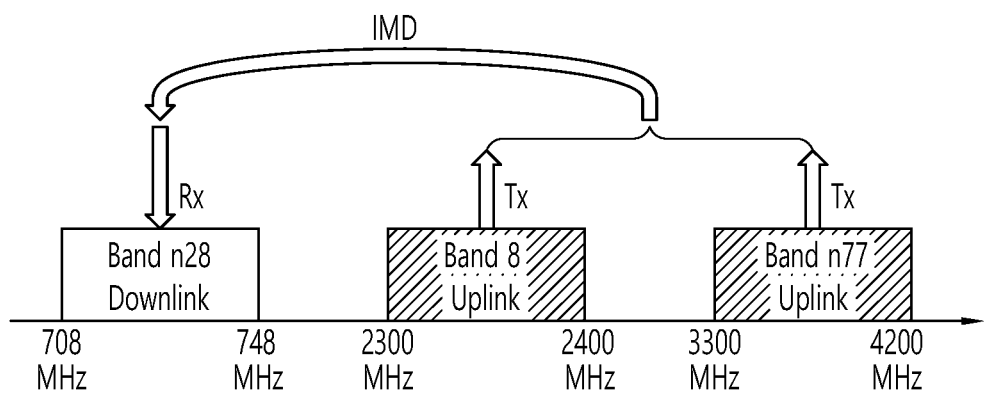

FIGS. 10a and 10b illustrate exemplary IMD by a combination of bands 8, n28 and n77.

There is IMD4 products produced by Band 8 and n28 that impact the reference sensitivity of NR band n77. For example, as shown in FIG. 10a, if the UE transmits uplink signals via uplink bands of operating bands 8 and n28, IMD products are produced and then a reference sensitivity in operating band n77 is degraded. Therefore, a value of MSD is needed to apply the reference sensitivity.

In addition, there is IMD4 product produced by Band 8 and n77 that impact the reference sensitivity of NR Band n28. The required MSD are shown in Table 10. For example, as shown in FIG. 10b, if the UE transmits uplink signals via uplink bands of operating bands 8 and n77, IMD products are produced and then a reference sensitivity in operating band n28 is degraded. Therefore, a value of MSD is needed to apply the reference sensitivity.

Table 10 shows a MSD exception for Scell due to dual uplink operation for EN-DC_8 A_n28A-n77A.

IV-5. Proposed MSD Level for DC_42 A_n28A-n77A

There is IMD2 products produced by Band 42 and n28 that impact the reference sensitivity of NR n77.

Table 10 shows MSD exception for Scell due to dual uplink operation for EN-DC_42 A_n28A-n77A.

IV-6. Proposed MSD Level for DC_2 a_n38A-n78A.

Figure 11:
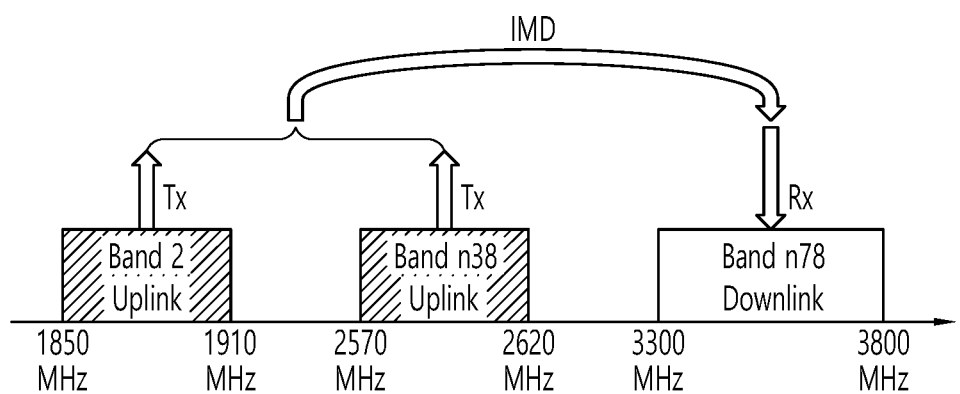
FIG. 11 illustrates exemplary IMD by a combination of band 2, n38 and n78.

FIG. 11 illustrates exemplary IMD by a combination of band 2, n38 and n78.

There are IMD3 products produced by Band 2 and n38 that impact the reference sensitivity of NR n78. For example, as shown in FIG. 11, if the UE transmits uplink signals via uplink bands of operating bands 2 and n38, IMD products are produced and then a reference sensitivity in operating band n78 is degraded. Therefore, a value of MSD is needed to apply the reference sensitivity.

Table 10 shows MSD exception for Scell due to dual uplink operation for EN-DC_2 A_n38A-n78A.

IV-7. Proposed MSD level for DC_66 A_n38A-n78A.

Figure 12:
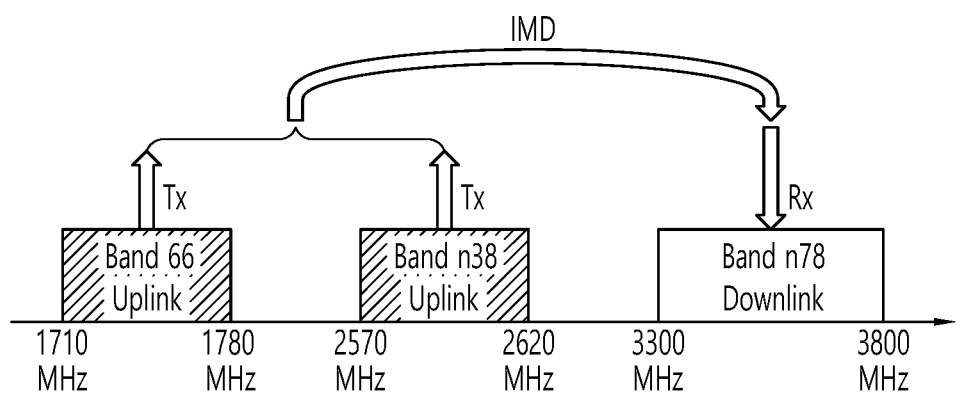
FIG. 12 illustrates exemplary IMD by a combination of band 66, n38 and n78.

FIG. 12 illustrates exemplary IMD by a combination of band 66, n38 and n78.

There are IMD3 products produced by Band 66 and n38 that impact the reference sensitivity of NR n78. For example, as shown in FIG. 12, if the UE transmits uplink signals via uplink bands of operating bands 66 and n38, IMD products are produced and then a reference sensitivity in operating band n78 is degraded. Therefore, a value of MSD is needed to apply the reference sensitivity.

Table 10 shows MSD exception for Scell due to dual uplink operation for EN-DC_66 A_n38A-n78A.

IV-8. Proposed MSD level for DC_18 A_n3A-n77A

There is IMD3 products produced by Band 18 and n3 that impact the reference sensitivity of NR n77.

In addition, there is IMD3 product produced by Band 18 and n77 that impact the reference sensitivity of NR Band n3. The required MSD are shown in the Table 10.

Table 10 shows MSD exception for Scell due to dual uplink operation for EN-DC_18 A_n3A-n77A.

IV-9. Proposed MSD level for DC_28 A_n3A-n77A

Figure 13A:
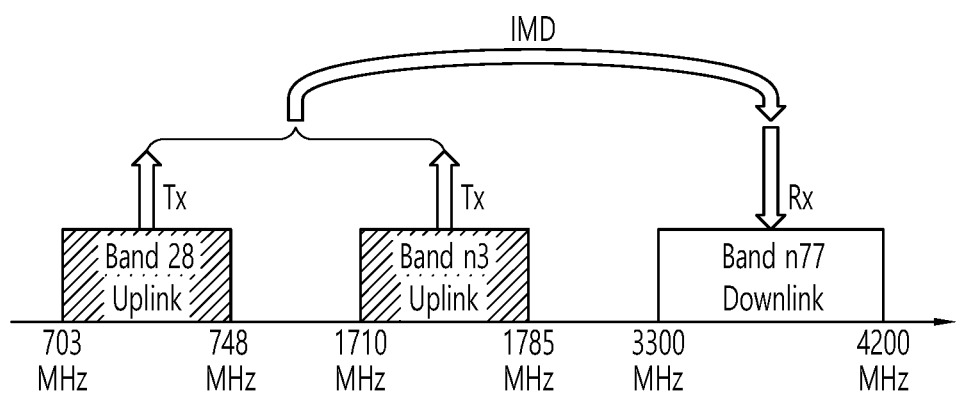
FIGS. 13a and 13b illustrate exemplary IMD by a combination of bands 28, n3 and n77.
Figure 13B:
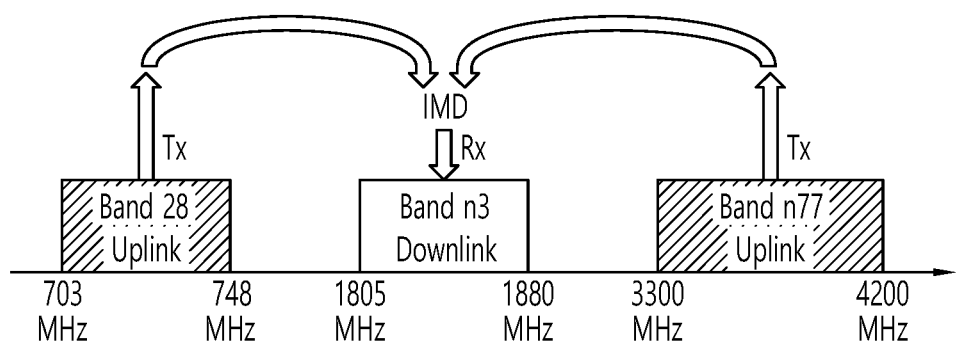

FIGS. 13a and 13b illustrate exemplary IMD by a combination of bands 28, n3 and n77.

There is IMD3 products produced by Band 28 and n3 that impact the reference sensitivity of NR band n77. For example, as shown in FIG. 13a, if the UE transmits uplink signals via uplink bands of operating bands 28 and n3, IMD products are produced and then a reference sensitivity in operating band n77 is degraded. Therefore, a value of MSD is needed to apply the reference sensitivity.

In addition, there is IMD3 product produced by Band 28 and n77 that impact the reference sensitivity of NR Band n3. The required MSD are shown in Table 10. For example, as shown in FIG. 13b, if the UE transmits uplink signals via uplink bands of operating bands 28 and n77, IMD products are produced and then a reference sensitivity in operating band n3 is degraded. Therefore, a value of MSD is needed to apply the reference sensitivity.

Table 10 shows a MSD exception for Scell due to dual uplink operation for EN-DC_28 A_n3A-n77A.

IV-10. Proposed MSD level for DC_41 A_n28A-n77A

Figure 14A:
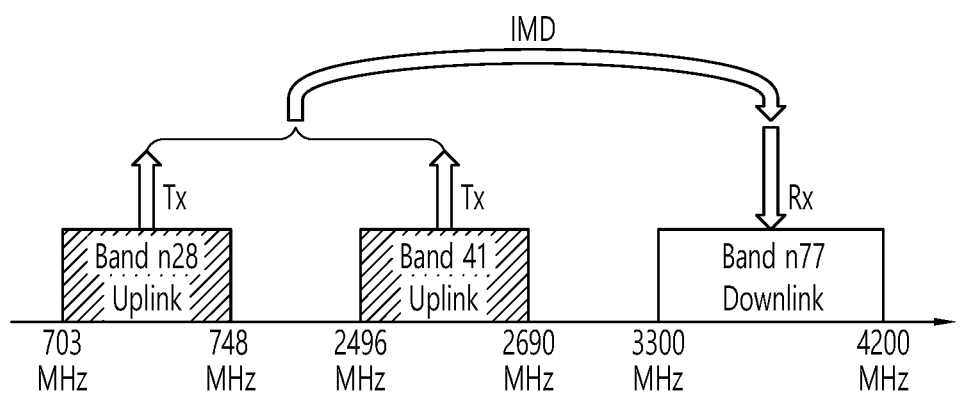
FIGS. 14a and 14b illustrate exemplary IMD by a combination of bands 41, n28 and n77.
Figure 14B:
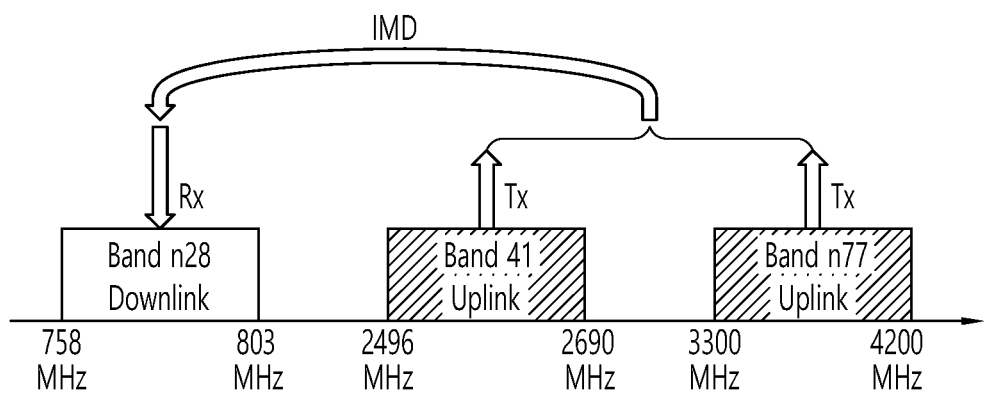

FIGS. 14a and 14b illustrate exemplary IMD by a combination of bands 41, n28 and n77.

There is IMD2 products produced by Band 41 and n28 that impact the reference sensitivity of NR band n77. For example, as shown in FIG. 14a, if the UE transmits uplink signals via uplink bands of operating bands 41 and n28, IMD products are produced and then a reference sensitivity in operating band n77 is degraded. Therefore, a value of MSD is needed to apply the reference sensitivity.

In addition, there is IMD2 product produced by Band 41 and n77 that impact the reference sensitivity of NR Band n28. The required MSD are shown in Table 10. For example, as shown in FIG. 14b, if the UE transmits uplink signals via uplink bands of operating bands 41 and n77, IMD products are produced and then a reference sensitivity in operating band n28 is degraded. Therefore, a value of MSD is needed to apply the reference sensitivity.

Table 10 shows a MSD exception for Scell due to dual uplink operation for EN-DC_41 A_n28A-n77A.

IV-11. Proposed MSD level for DC_41 A_n28A-n78A

Figure 15A:
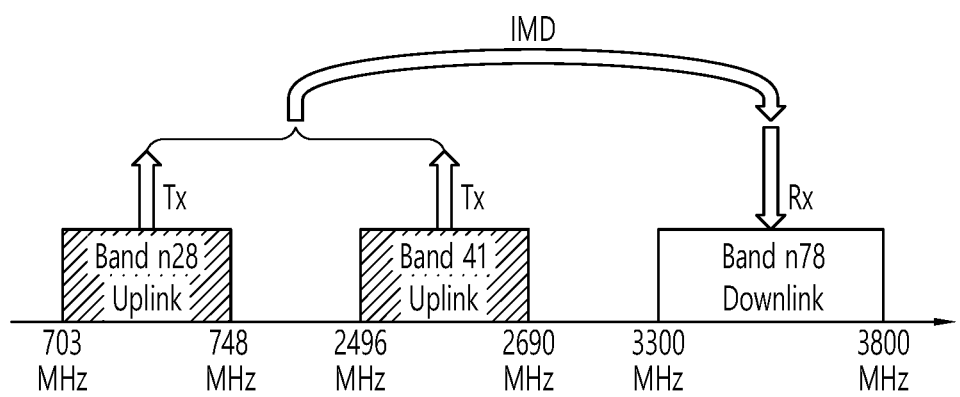
FIGS. 15a and 15b illustrate exemplary IMD by a combination of bands 41, n28 and n78.
Figure 15B:
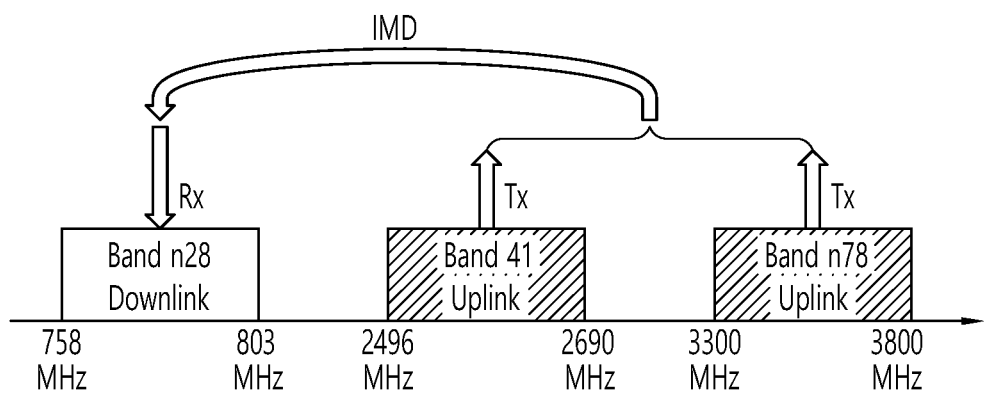

FIGS. 15a and 15b illustrate exemplary IMD by a combination of bands 41, n28 and n78.

There is IMD2 products produced by Band 41 and n28 that impact the reference sensitivity of NR band n78. For example, as shown in FIG. 15a, if the UE transmits uplink signals via uplink bands of operating bands 41 and n28, IMD products are produced and then a reference sensitivity in operating band n78 is degraded. Therefore, a value of MSD is needed to apply the reference sensitivity.

In addition, there is IMD2 product produced by Band 41 and n78 that impact the reference sensitivity of NR Band n28. The required MSD are shown in Table 10. For example, as shown in FIG. 15b, if the UE transmits uplink signals via uplink bands of operating bands 41 and n78, IMD products are produced and then a reference sensitivity in operating band n28 is degraded. Therefore, a value of MSD is needed to apply the reference sensitivity.

Table 10 shows a MSD exception for Scell due to dual uplink operation for EN-DC_41 A_n28A-n78A.

IV-12. Proposed MSD level for DC_1 A_n41A-n78A

There is IMD3 products produced by Band 1 and n41 that impact the reference sensitivity of NR n78.

In addition, there is IMD4 product produced by Band 1 and n78 that impact the reference sensitivity of NR Band n41. The required MSD are shown in Table 10.

Table 10 shows MSD exception for Scell due to dual uplink operation for EN-DC_1 A_n41A-n78A.

IV-13. Proposed MSD level for DC_3 A_n41A-n78A

There is IMD3 products produced by Band 3 and n41 that impact the reference sensitivity of NR n78.

Table 10 shows MSD exception for Scell due to dual uplink operation for EN-DC_3 A_n41A-n78A.

IV-14. Proposed MSD level for DC_20 A_n41A-n78A

There is IMD2 products produced by Band 20 and n41 that impact the reference sensitivity of NR n78.

In addition, there is IMD2 product produced by Band 20 and n78 that impact the reference sensitivity of NR Band n41. The required MSD are shown in Table 10.

Table 10 shows MSD exception for Scell due to dual uplink operation for EN-DC_20 A_n41A-n78A.

IV-15. Proposed MSD level for DC_1 A_n75A-n78A

There is IMD2 products produced by Band 1 and n78 that impact the reference sensitivity of NR n75.

Table 10 shows MSD exception for Scell due to dual uplink operation for EN-DC_1 A_n75A-n78A.

IV-16. Proposed MSD level for DC_3 A_n75A-n78A

Figure 16:
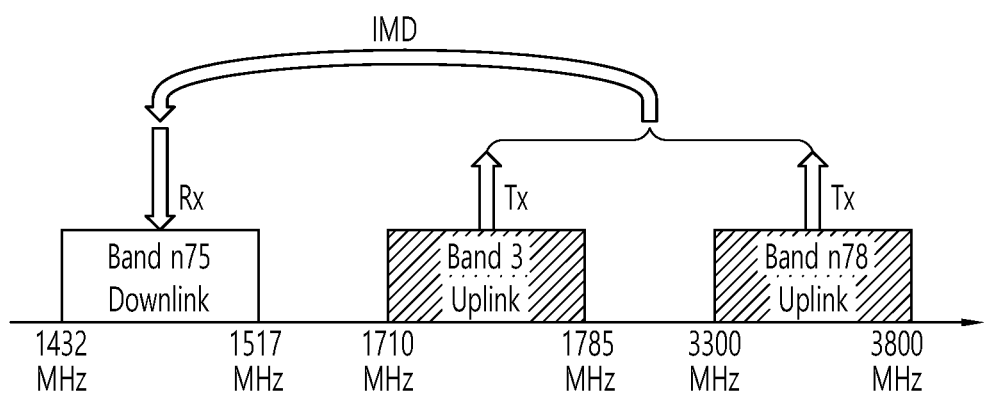
FIG. 16 illustrates exemplary IMD by a combination of band 66, n38 and n78.

FIG. 16 illustrates exemplary IMD by a combination of band 66, n38 and n78.

There are IMD2 products produced by Band 3 and n78 that impact the reference sensitivity of NR n75. For example, as shown in FIG. 16, if the UE transmits uplink signals via uplink bands of operating bands 3 and n78, IMD products are produced and then a reference sensitivity in operating band n75 is degraded. Therefore, a value of MSD is needed to apply the reference sensitivity.

Table 10 shows MSD exception for Scell due to dual uplink operation for EN-DC_3 A_n75A-n78A.

IV-17. Proposed MSD level for CA_n3A_n28A-n77A

Figure 17:
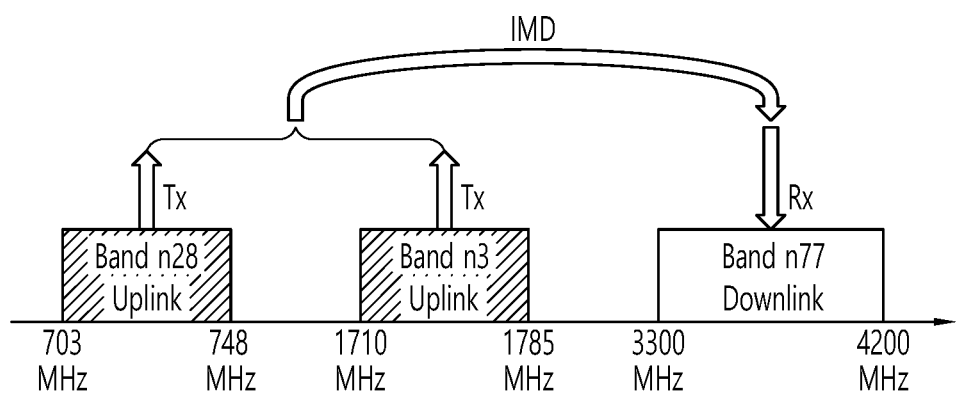
FIG. 17 illustrates an example of IMD for CA by a combination of band n3, n28 and n77.

FIG. 17 illustrates an example of IMD for CA by a combination of band n3, n28 and n77.

There are IMD3 products produced by Band n3 and n28 that impact the reference sensitivity of NR n77. For example, as shown in FIG. 17, if the UE transmits uplink signals via uplink bands of operating bands n3 and n28, IMD products are produced and then a reference sensitivity in operating band n77 is degraded. Therefore, a value of MSD is needed to apply the reference sensitivity.

Table 10 shows MSD exception for Scell due to uplink operation for NR-CA_n3A_n28A-n77A.

IV-18. Proposed MSD level for CA_11 A-n28A

Figure 18:
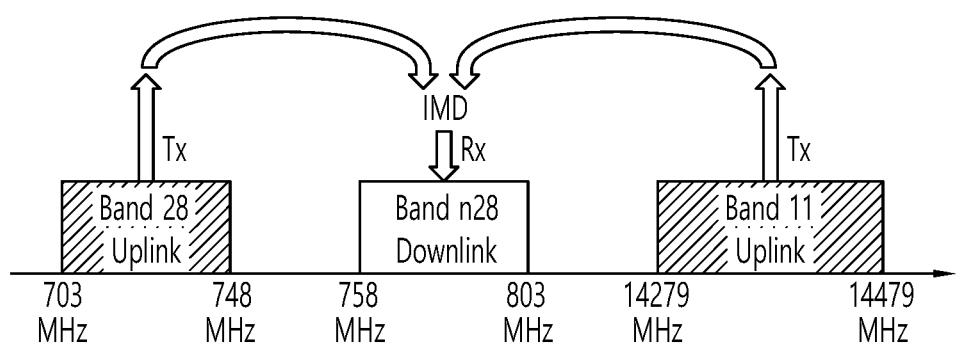
FIG. 18 illustrates an example of IMD for CA by a combination of band 11 and n28.

FIG. 18 illustrates an example of IMD for CA by a combination of band 11 and n28.

There are IMD4 products produced by Bands 11 and n28 that impacts the reference sensitivity of NR n28. For example, as shown in FIG. 18, if the UE transmits uplink signals via uplink bands of operating bands 11 and n28, IMD products are produced and then a reference sensitivity in operating band n28 is degraded. Therefore, a value of MSD is needed to apply the reference sensitivity.

In addition, there are IMD4 product produced by Bands 11 and n28 that impact the reference sensitivity of Band 11.

Table 10 shows MSD exception for Scell due to uplink operation for NR-CA_11 A-n28A.

IV-19. Proposed MSD level for DC_18 A-41A_n3A/DC_18 A-41C_n3A

Figure 19A:
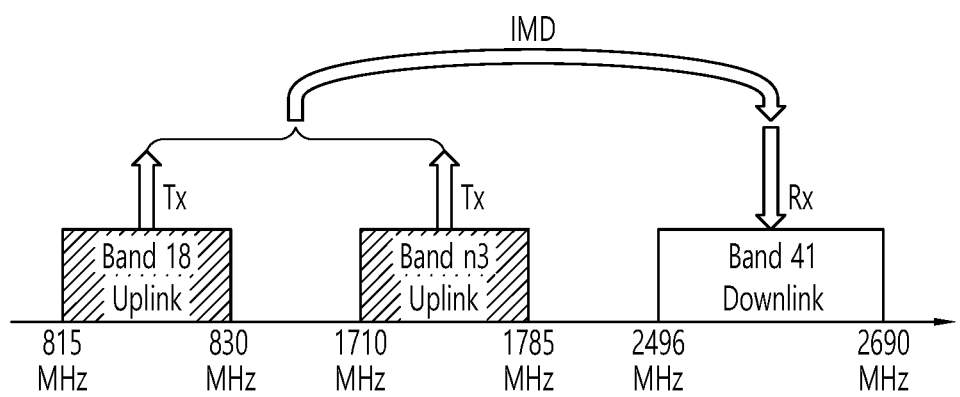
FIGS. 19a and 19b illustrate exemplary IMD by a combination of bands 18, n41 and n3.
Figure 19B:
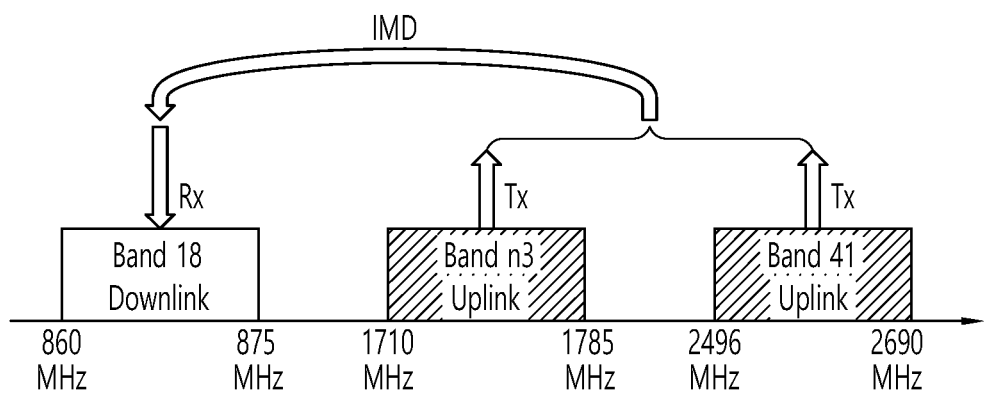

FIGS. 19a and 19b illustrate exemplary IMD by a combination of bands 18, n41 and n3.

There is IMD3 products produced by Band 18 and n3 that impact the reference sensitivity of band 41. For example, as shown in FIG. 19a, if the UE transmits uplink signals via uplink bands of operating bands 18 and n3, IMD products are produced and then a reference sensitivity in operating band 41 is degraded. Therefore, a value of MSD is needed to apply the reference sensitivity.

In addition, there is IMD2 product produced by Band 41 and n3 that impact the reference sensitivity of Band 18. The required MSD are shown in Table 10. For example, as shown in FIG. 19b, if the UE transmits uplink signals via uplink bands of operating bands 41 and n3, IMD products are produced and then a reference sensitivity in operating band 18 is degraded. Therefore, a value of MSD is needed to apply the reference sensitivity.

Table 10 shows a MSD exception for Scell due to dual uplink operation for EN-DC_18 A-41A_n3A.

IV-20. Proposed MSD level for DC_18 A-41A_n77A/DC_18 A-41C_n77A

Figure 20:
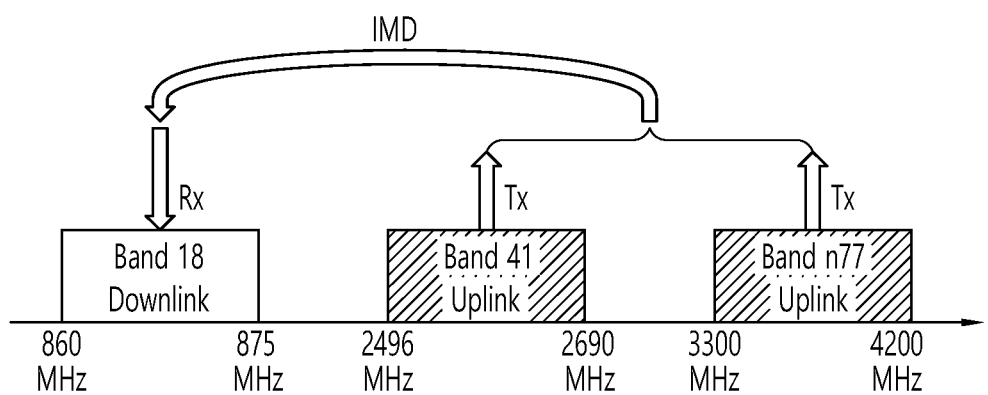
FIG. 20 illustrates exemplary IMD by a combination of band 18, 41 and n77.

FIG. 20 illustrates exemplary IMD by a combination of band 18, 41 and n77.

There are IMD5 products produced by Band 41 and n77 that impact the reference sensitivity of band 18. For example, as shown in FIG. 20, if the UE transmits uplink signals via uplink bands of operating bands 41 and n77, IMD products are produced and then a reference sensitivity in operating band 18 is degraded. Therefore, a value of MSD is needed to apply the reference sensitivity.

Table 10 shows MSD exception for Scell due to dual uplink operation for EN-DC_18 A-41A_n77A.

IV-21. Proposed MSD level for DC_18 A-41A_n78A/DC_18 A-41C_n78A

Figure 21:
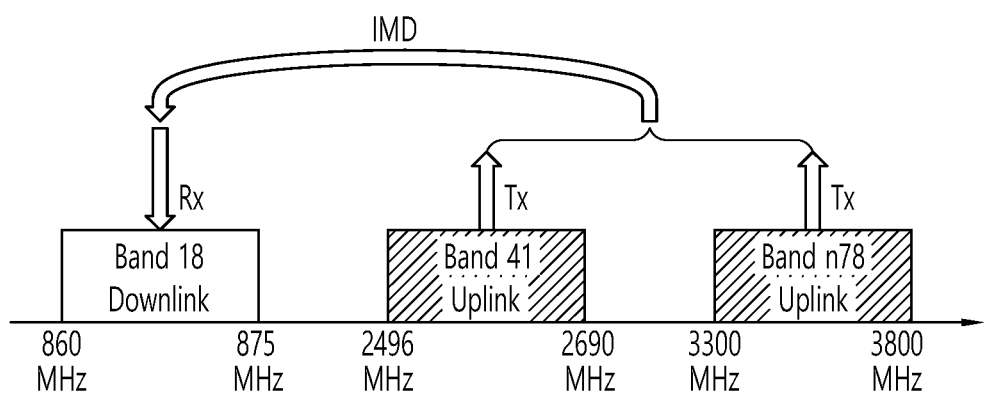
FIG. 21 illustrates exemplary IMD by a combination of band 18, 41 and n78.

FIG. 21 illustrates exemplary IMD by a combination of band 18, 41 and n78.

There are IMD5 products produced by Band 41 and n78 that impact the reference sensitivity of band 18. For example, as shown in FIG. 21, if the UE transmits uplink signals via uplink bands of operating bands 41 and n78, IMD products are produced and then a reference sensitivity in operating band 18 is degraded. Therefore, a value of MSD is needed to apply the reference sensitivity.

Table 10 shows MSD exception for Scell due to dual uplink operation for EN-DC_18 A-41A_n78A.

Figure 22:
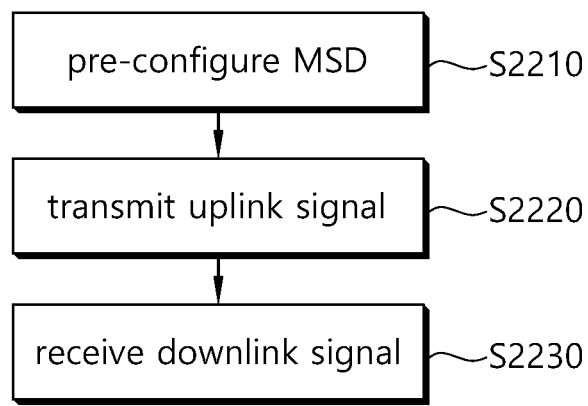
FIG. 22 is a flow chart showing an example of a procedure of a terminal according to the present disclosure.

FIG. 22 is a flow chart showing an example of a procedure of a terminal according to the present disclosure.

Referring to FIG. 22, steps S1210 to S1230 are shown. Operations described below may be performed by the terminal.

For reference, step S1210 may not always be performed when the terminal performs communication. For example, step S1210 may be performed only when the reception performance of the terminal is tested.

In step S1210, the terminal may preset the above proposed MSD value. For example, the terminal may preset the MSD values in Table 10. For example, for the combination of the DC_28 A-n3A-n77A downlink band and the DC_28 A-n77A uplink band, an MSD of 17.0 dB may be applied to the reference sensitivity of the downlink band n3.

In step S1220, the terminal may transmit the uplink signal.

When the combination of the DC_28 A-n3A-n77A downlink band and the DC_28 A-n77A uplink band is configured in the terminal, the terminal may transmit the uplink signal through the uplink operating bands 28 and n77.

In step S1230, the terminal may receive the downlink signal.

The terminal may receive the downlink signal based on the reference sensitivity of the downlink band n3, to which the MSD value is applied.

When the combination of the DC_28 A-n3A-n77A downlink band and the DC_28 A-n77A uplink band is configured in the terminal, the terminal may receive the downlink signal through the downlink operating band n3.

For reference, the order in which steps S1220 and S1230 are performed may be different from that shown in FIG. 24. For example, step S1230 may be performed first and then step S1220 may be performed. Alternatively, step S1220 and step S1230 may be performed simultaneously. Alternatively, the time when step S1220 and step S1230 may be may overlap partially.

The present disclosure can have various advantageous effects.

For example, by performing disclosure of this specification, UE can transmit signal with dual uplink by applying MSD value.

Effects obtained through specific examples of the present specification are not limited to the effects listed above. For example, there may be a variety of technical effects that a person having ordinary skill in the related art can understand or derive from this specification. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A device configured to operate in a wireless system, the device comprising:
    a transceiver configured with an Evolved Universal Terrestrial Radio Access (E-UTRA)-New Radio (NR) Dual Connectivity (EN-DC),
    wherein the EN-DC is configured to use three bands,
    a processor operably connectable to the transceiver,
    wherein the processer is configured to:
    control the transceiver to receive a downlink signal,
    control the transceiver to transmit an uplink signal via at least two bands among the three bands,
    wherein a value of Maximum Sensitivity Degradation (MSD) is applied to a reference sensitivity for receiving the downlink signal,
    wherein the value of the MSD is pre-configured for a first combination of bands 7, n8 and n40, a second combination of band 8, n28 and n77, a third combination of bands 3, n28 and n77, a fourth combination of bands 3, n75 and n78, a fifth combination of bands 2, n38 and n78, a sixth combination of bands 66, n38 and n78, a seventh combination of bands 28, n3 and n77, an eighth combination of bands 41, n3 and n77, a ninth combination of bands 41, n3 and n78, a tenth combination of bands 41, n28 and n77, an eleventh combination of bands 41, n28 and n78, a twelfth combination of bands 18, 41 and n3, a thirteenth combination of bands 18, 41 and n77 or a fourteenth combination of bands 18, 41 and n78,
    wherein the value of the MSD is 3.0 dB for band n40 based on the first combination of bands 7, n8 and n40.

2. The device of claim 1,
    wherein the value of the MSD is 10.3 dB for band n77 based on the second combination of band 8, n28 and n77,
    wherein the value of the MSD is 11.6 dB for band n28 based on the second combination of band 8, n28 and n77.

3. The device of claim 1,
    wherein the value of the MSD is 15.9 dB for band n77 based on the third combination of bands 3, n28 and n77,
    wherein the value of the MSD is 15.3 dB for band n28 based on the third combination of bands 3, n28 and n77.

4. The device of claim 1,
    wherein the value of the MSD is 10.0 dB for band n75 based on the fourth combination of bands 3, n75 and n78.

5. The device of claim 1,
    wherein the value of the MSD is 14.8 dB for band n78 based on the fifth combination of bands 2, n38 and n78.

6. The device of claim 1,
    wherein the value of the MSD is 15.0 dB for band n78 based on the sixth combination of bands 66, n38 and n78.

7. The device of claim 1,
    wherein the value of the MSD is 17.0 dB for band n3 based on the seventh combination of bands 28, n3 and n77,
    wherein the value of the MSD is 15.9 dB for band n77 based on the seventh combination of bands 28, n3 and n77.

8. The device of claim 1,
    wherein the value of the MSD is 16.4 dB for band n3 i) based on the eighth combination of bands 41, n3 and n77 or ii) based on the ninth combination of bands 41, n3 and n78,
    wherein the value of the MSD is 16.8 dB for band n77 i) based on the eighth combination of bands 41, n3 and n77 or ii) based on the ninth combination of bands 41, n3 and n78.

9. The device of claim 1,
    wherein the value of the MSD is 28.2 dB for band n77 based on the tenth combination of bands 41, n28 and n77,
    wherein the value of the MSD is 30.8 dB for band n28 i) based on the tenth combination of bands 41, n28 and n77 or ii) based on the eleventh combination of bands 41, n28 and n78,
    wherein the value of the MSD is 28.2 dB for band n78 based on the eleventh combination of bands 41, n28 and n78.

10. The device of claim 1,
    wherein the value of the MSD is 16.0 dB for band 41 based on the twelfth combination of bands 18, 41 and n3,
    wherein the value of the MSD is 28.9 dB for band 18 based on the twelfth combination of bands 18, 41 and n3.

11. The device of claim 1,
    wherein the value of the MSD is 3.4 dB for band 18 based on the thirteenth combination of bands 18, 41 and n77.

12. The device of claim 1,
    wherein the value of the MSD is 3.4 dB for band 18 based on the fourteenth combination of bands 18, 41 and n78.

13. The device of claim 1,
    wherein for the first combination of bands 7, n8 and n40, the band 7 is used for the E-UTRA and the bands n8 and n40 are used for the NR,
    wherein for the second combination of bands 8, n28 and n77, the band 8 is used for the E-UTRA and the bands n28 and n77 are used for the NR,
    wherein for the third combination of bands 3, n28 and n77, the band 3 is used for the E-UTRA and the bands n28 and n77 are used for the NR,
    wherein for the fourth combination of bands 3, n75 and n78, the band 3 is used for the E-UTRA and the bands n75 and n78 are used for the NR,
    wherein for the fifth combination of bands 2, n38 and n78, the band 2 is used for the E-UTRA and the bands n38 and n78 are used for the NR,
    wherein for the sixth combination of bands 66, n38 and n78, the band 66 is used for the E-UTRA and the bands n38 and n78 are used for the NR,
    wherein for the seventh combination of bands 28, n3 and n77, the band 28 is used for the E-UTRA and the bands n3 and n77 are used for the NR,
    wherein for the eighth combination of bands 41, n3 and n77, the band 41 is used for the E-UTRA and the bands n3 and n77 are used for the NR,
    wherein for the ninth combination of bands 41, n3 and n78, the band 41 is used for the E-UTRA and the bands n3 and n78 are used for the NR, wherein for the tenth combination of bands 41, n28 and n77, the band 41 is used for the E-UTRA and the bands n28 and n77 are used for the NR, wherein for the eleventh combination of bands 41, n28 and n78, the band 41 is used for the E-UTRA and the bands n28 and n78 are used for the NR, wherein for the twelfth combination of bands 18, 41 and n3, the bands 18 and 41 are used for the E-UTRA and the band n3 is used for the NR, wherein for the thirteenth combination of bands 18, 41 and n77, the bands 18 and 41 are used for the E-UTRA and the band n77 is used for the NR, wherein for the fourteenth combination of bands 18, 41 and n78, the bands 18 and 41 are used for the E-UTRA and the band n78 is used for the NR.

14. A device configured to operate in a wireless system, the device comprising:
   a transceiver configured with an Evolved Universal Terrestrial Radio Access (E-UTRA)-New Radio (NR) Dual Connectivity (EN-DC),
   wherein the EN-DC is configured to use two bands,
   a processor operably connectable to the transceiver,
   wherein the processor is configured to:
   control the transceiver to receive a downlink signal,
   control the transceiver to transmit an uplink signal via the two bands,
   wherein a value of Maximum Sensitivity Degradation (MSD) is applied to a reference sensitivity for receiving the downlink signal,
   wherein the value of the MSD is pre-configured for a combination of bands 11 and n28,
   wherein the value of the MSD is 10.4 dB for band n28,
   wherein for the combination of bands 11 and n28, the band 11 is used for the E-UTRA and the band n28 is used for the NR.

15. A device configured to operate in a wireless system, the device comprising:
   a transceiver configured with New Radio (NR) operating bands for CA (Carrier Aggregation),
   wherein the NR operating bands are configured to three bands
   a processor operably connectable to the transceiver,
   wherein the processer is configured to:
   control the transceiver to receive a downlink signal,
   control the transceiver to transmit an uplink signal via at least two bands among the three bands,
   wherein a value of Maximum Sensitivity Degradation (MSD) is applied to a reference sensitivity for receiving the downlink signal,
   wherein the value of the MSD is pre-configured for a combination of bands n3, n28 and n77,
   wherein the value of the MSD is 15.9 dB for band n77.

* * * * *